US012763800B2

(12) United States Patent
Kalhan et al.

(10) Patent No.: US 12,763,800 B2
(45) Date of Patent: Oct. 13, 2026

(54) FULL DUPLEX INTERFERENCE MANAGEMENT BASED ON SIDELINK CHANNEL REPORTS

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 231 days.

(21) Appl. No.: 18/845,805

(22) PCT Filed: Apr. 27, 2023

(86) PCT No.: PCT/US2023/020142
§ 371 (c)(1),
(2) Date: Sep. 10, 2024

(87) PCT Pub. No.: WO2023/212157
PCT Pub. Date: Nov. 2, 2023

(65) Prior Publication Data

US 2025/0192808 A1 Jun. 12, 2025

Related U.S. Application Data

(60) Provisional application No. 63/336,413, filed on Apr. 29, 2022.

(51) Int. Cl.
*H04B 1/00* (2006.01)
*H04B 17/27* (2015.01)
(Continued)

(52) U.S. Cl.
CPC ........... *H04B 1/0057* (2013.01); *H04B 17/27* (2015.01); *H04L 5/14* (2013.01); *H04L 5/1461* (2013.01);
(Continued)

(58) Field of Classification Search
CPC .... H04B 1/0057; H04B 17/27; H04B 17/328; H04B 7/086; H04B 17/345; H04B 7/0617;
(Continued)

(56) References Cited

U.S. PATENT DOCUMENTS

2013/0114468 A1 5/2013 Hui et al.
2016/0173164 A1* 6/2016 Kim ......................... H04B 1/44 370/278
(Continued)

FOREIGN PATENT DOCUMENTS

EP 2777210 B1 10/2021
WO 2020032578 A1 2/2020
(Continued)

OTHER PUBLICATIONS

Garg et al. "Wideband, millimeter wave domain Si canceling (> 50dB) in-band full-duplex circulator receiver." IEEE Access 10 (2022): 37953-37966.

*Primary Examiner* — Ashley Shivers

(57) ABSTRACT

A downlink-receiving device receives full duplex information from a base station where the full duplex information is based on a sidelink channel state report of the sidelink channel between the downlink-receiving device and an uplink-transmitting device. The full duplex information comprises antenna pattern parameters that are applied by the downlink-receiving device to adjust a receiving antenna pattern to have a null in the direction of the uplink transmitting device. The reception gain within the null is at least less than a reception gain of at least one other portion of the receive antenna pattern.

20 Claims, 16 Drawing Sheets

(51) Int. Cl.

| | |
|---|---|
| ***H04L 5/14*** | (2006.01) |
| ***H04W 16/28*** | (2009.01) |
| ***H04W 72/1268*** | (2023.01) |

(52) U.S. Cl.
CPC ....... *H04W 16/28* (2013.01); *H04W 72/1268* (2013.01)

(58) Field of Classification Search
CPC ........ H04L 5/14; H04L 5/1461; H04W 16/28; H04W 72/1268; H04W 8/24; H04J 11/0023
See application file for complete search history.

(56) References Cited

U.S. PATENT DOCUMENTS

| | | | | |
|---|---|---|---|---|
| 2019/0124521 | A1 | 4/2019 | Yang et al. | |
| 2021/0367660 | A1 | 11/2021 | Jo et al. | |
| 2022/0131680 | A1* | 4/2022 | Abedini | H04W 28/16 |
| 2023/0189027 | A1* | 6/2023 | Huang | H04B 17/345 370/329 |
| 2023/0232249 | A1* | 7/2023 | Kim | H04B 17/336 370/329 |
| 2026/0143481 | A1* | 5/2026 | Regev | H04B 7/0628 |

FOREIGN PATENT DOCUMENTS

| | | | |
|---|---|---|---|
| WO | 2021249531 | A1 | 12/2021 |
| WO | 2022029197 | A1 | 2/2022 |
| WO | 2023212153 | A1 | 11/2023 |

* cited by examiner

750

FULL DUPLEX INTERFERENCE MANAGEMENT BASED ON SIDELINK CHANNEL REPORTS

CLAIM OF PRIORITY

The present application claims the benefit of priority to Provisional Application No. 63/336,413 entitled "Obtaining UE Locations Within The Cell", docket number TPRO 00374 US, filed Apr. 29, 2022, assigned to the assignee hereof and hereby expressly incorporated by reference in its entirety.

FIELD

This invention generally relates to wireless communications and more particularly to full duplex transmissions and interference management.

BACKGROUND

Many wireless communication systems employ base stations that provide wireless service to user equipment (UE) devices. Some systems utilize full duplex (FD) communication where the base station schedules the simultaneous transmissions of uplink and downlink signals. In some situations, an uplink transmission from one UE device may interfere with a downlink transmission to another UE device since both the downlink and the uplink transmissions share the same channel bandwidth. Therefore, the uplink signal transmitted by an uplink-transmitting device causes interference at a neighboring downlink-receiving UE device.

SUMMARY

A downlink-receiving device receives full duplex information from a base station where the full duplex information is based on a sidelink channel state report of the sidelink channel between the downlink-receiving device and an uplink-transmitting device. The full duplex information comprises antenna pattern parameters that are applied by the downlink-receiving device to adjust a receiving antenna pattern to have a null in the direction of the uplink transmitting device. The reception gain within the null is at least less than a reception gain of at least one other portion of the receive antenna pattern.

DETAILED DESCRIPTION

Figure 1A:
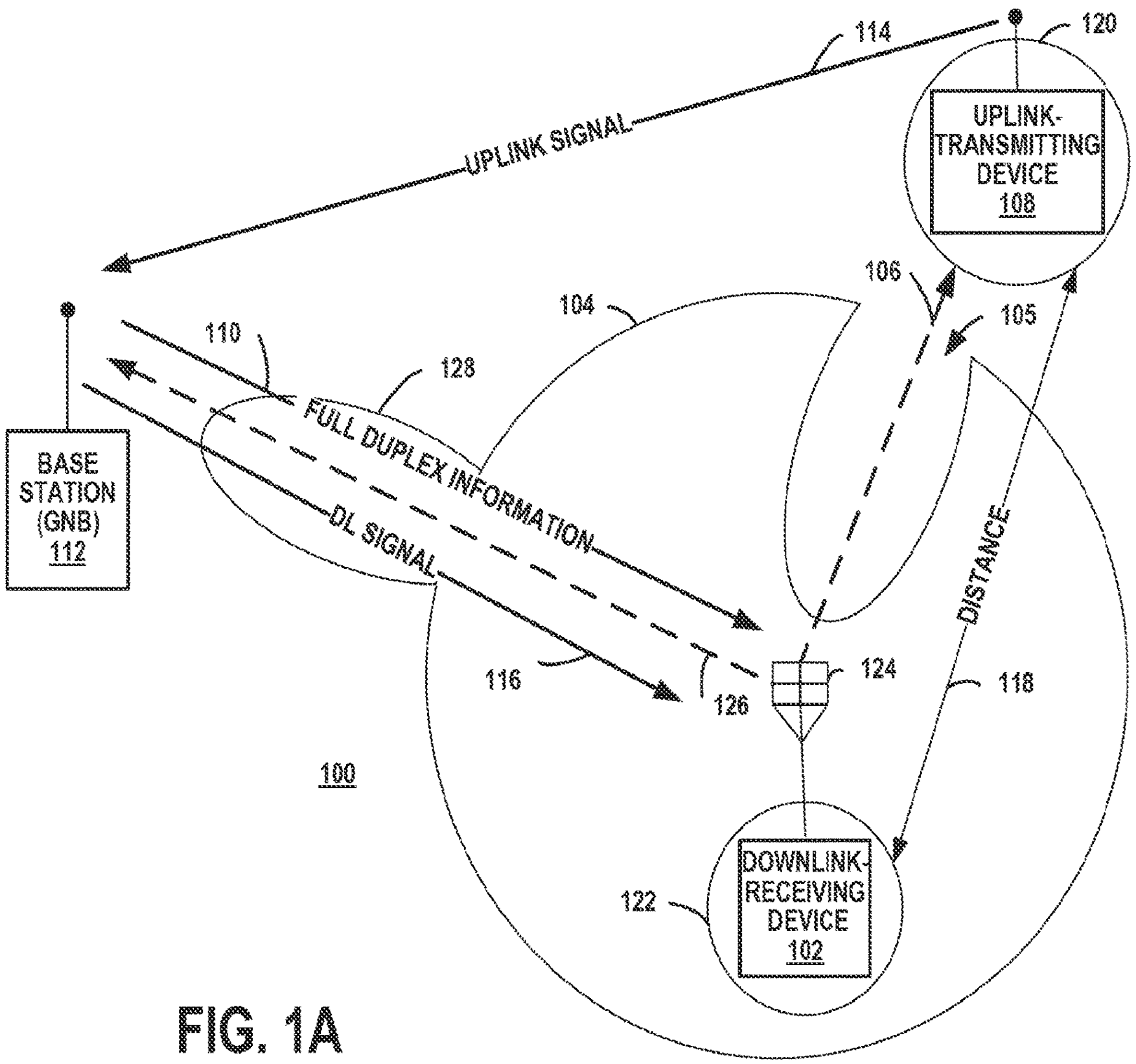
FIG. 1A is a block diagram of an example of a communication system where a downlink-receiving device adjusts a receive antenna pattern to have a reception null in a direction of an uplink-transmitting device in response to receiving full duplex information from a base station.

As discussed above, full duplex communication between a base station and multiple communication devices may result in interference where the uplink signal transmitted by the uplink-transmitting device interferes with the reception of the downlink signal at the downlink-receiving device. In accordance with some of the examples herein, however, the downlink-receiving device creates a null in the receive antenna pattern in the direction of the uplink-transmitting device to at least reduce interference at the downlink-receiving device due to the transmission of the uplink-transmitting device. The downlink-receiving device receives information regarding at least the timing of uplink transmissions by the uplink-transmitting device. In some examples, the downlink-receiving device adjusts the receive antenna pattern based on the location of the uplink-transmitting device to create the null. In some situations, the downlink-receiving device determines the location of the uplink-transmitting device prior to the potentially interfering full duplex communications. The base station may provide information to at least assist the downlink-receiving device in determining the location of the uplink-transmitting device. The antenna pattern is adjusted to create the null at least when the downlink-receiving device is receiving a downlink signal within a channel at the same time the uplink-transmitting device is using the same channel for uplink transmission. The base station may provide, in addition or in the alternative to the location information, antenna parameters for the receive antenna pattern. For some of the examples herein, therefore, the base station provides, to a downlink-receiving device, at least uplink timing information of potentially interfering uplink transmissions from an uplink-transmitting device.

In some other examples, the base station provides, to the uplink-transmitting device, downlink timing information for downlink transmissions from the base station to the downlink-receiving device. The base station may also provide the identity of the downlink-receiving device. The uplink-transmitting device adjusts a transmission antenna pattern to create a null in the direction of the downlink-receiving device. In some examples, the base station provides transmission precoder parameters that are applied to create the interference-reducing antenna pattern.

In still other examples herein, sidelink channel information is reported to the base station and the base station determines antenna parameters based on the sidelink channel information where the antenna parameters include receive antenna parameters and/or transmission antenna parameters. The base station transmits full duplex information to at least one of the downlink-receiving device and the uplink-transmitting device where the full duplex information includes at least antenna parameters. Full duplex information transmitted to the downlink-receiving device at least includes receive antenna parameters and may include timing information such as uplink timing information for the uplink transmissions from the uplink-transmitting device. The downlink-receiving device applies the receive antenna parameters to create a null in the receive antenna pattern in the direction of the uplink-transmitting device. Full duplex information transmitted to the uplink-transmitting device at least includes transmission antenna parameters and may including timing information such as downlink timing information for the downlink transmissions to the downlink-receiving device. The uplink-transmitting device applies the transmission antenna parameters to create a null in the transmit antenna pattern in the direction of the downlink-receiving device.

Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or device-to-device (D2D) is employed. More specifically the techniques may be applied to current and future releases of 3GPP NR specifications. For example, the techniques may also be applied to 3GPP NR (Rel-17). In some situations, the techniques can be applied to UE devices that are not D2D capable but include sufficient functionality to receive and measure wireless signals from other UE devices where the other UE devices may or may not be D2D capable. For the example, the communication devices may be any type of device that can receive signals from, and transmit signals to, base stations and other UE devices. The communication devices typically operate in a communication system that includes a plurality of base stations that each provide wireless service within a service area.

In most situations, the uplink-transmitting device and the downlink-receiving device are user equipment (UE) communication devices. At least one of the devices, however, may be an Integrated Access and Backhaul (IAB) node communication device. In some situations, therefore, the base station may be an IAB donor. Accordingly, for the examples discussed herein, the base station may be an IAB donor and each of the communication devices may be either a IAB node or a UE device.

FIG. 1A is a block diagram of an example of a communication system 100 where a downlink-receiving device 102 adjusts a receive antenna pattern 104 to have a reception null 105 in a direction 106 of an uplink-transmitting device 108 in response to receiving full duplex information 110 from a base station 112. The downlink-receiving device 102 receives the full duplex information 110 from the base station 112 where the full duplex information 110 at least identifies the transmission timing of an uplink transmission from the uplink-transmitting device 108 to the base station 112. For the example, the full duplex information 110 identifies the uplink-transmitting device. The uplink-transmitting device 108 transmits at least one uplink signal 114 at the timing assigned by the station 112 within a channel. The downlink-receiving device 102 is scheduled to receive at least one downlink signal 116 using the same channel used by the uplink-transmitting device 108 to transmit the at least one uplink signal 114. Therefore, the base station 112 schedules uplink transmission from the uplink-transmitting device 108 and downlink transmission to the downlink-receiving device 102 such that at least one uplink signal will be transmitted from the uplink-transmitting device at the same time and within the same channel as transmission of at least one downlink signal to the downlink-receiving device 102.

As discussed herein, the channel is any frequency bandwidth where the energy of the downlink transmission at least partially overlaps with the energy of the uplink transmission. The channel may be a channel assigned by the base station and/or specified by a communication specification. In some situations, one or both of the uplink transmission and the downlink transmission occupy the entire channel bandwidth. In other situations, the channel includes a plurality of sub-bands where the uplink transmission and downlink transmission may be within the same sub-band or within different sub-bands. Where the transmissions are within different sub-bands, however, the energy of the uplink transmission within the sub-band containing the downlink transmission is sufficiently high to at least potentially cause interference at the downlink-receiving device 102. At the location of the downlink-receiving device 102, therefore, some of the energy of the uplink signal transmitted in one sub-band overlaps with the energy of the downlink signal transmitted in another sub-band. In some situations, therefore, the energy of the uplink signal 114 may be within the sub-band used for transmitting the downlink signal 116 even though the two signals are transmitted within different sub-bands.

For the example of FIG. 1A, the base station 112 has access to distance information indicating the distance 118 between the location 120 of the uplink-transmitting device and the location 122 of the downlink-receiving device. In response to determining that the distance is below a minimum distance threshold, the base station 112 transmits the full duplex information 110 to the downlink-receiving device 102. For the example, the full duplex information 110 at least identifies transmission timing of the communication resources that are used by the uplink-transmitting device 108 in the same channel where the downlink-receiving device 102 will receive one or more downlink signals. In some situations, the reception of the timing information indicates to the downlink-receiving device 102 that the transmission of the uplink signal 114 may interfere with reception of the downlink signal 116. In other situations, the full duplex information 110 may provide an interference indicator indicating the potential for interference and may identify the downlink communication that may be susceptible to interference. In other situations, the downlink-receiving device may identify the potential interfering uplink transmissions from the information provided by the full duplex information 110.

In at least some of the examples, the distance threshold used by the base station 112 is established based on worst-case estimate of the level of energy of the uplink signal 114 that will be received at the downlink-receiving device. Accordingly, the distance threshold may be selected based on a calculation of attenuation of radio energy that results from the combination of the estimated capture area of the antenna at the downlink-receiving device 102 and the obstacle free, line-of-sight path through free space. Since the actual path between the two devices 102, 108 may include obstacles, the actual uplink signal energy at the downlink-receiving device 102 may be lower than the worst-case estimate. Therefore, the base station 112, may apply other factors to the distance threshold selection. For example, where the base station 112 has information that the two devices are separated by a building, the distance threshold may be adjusted to be shorter for the particular device pair 102, 108.

In some examples, the base station tracks the locations of the devices 102, 108 based on location information provided by the devices 102, 108. Suitable techniques of location reporting are discussed in PCT Patent Application No PCT/US2023/013186, entitled DEVICE LOCATION BASED ON NON-REPORTING DEVICE LOCATION PROVIDED BY REPORTING DEVICE, and incorporated by reference in its entirety herein. The techniques discussed in PCT Patent Application No. PCT/US2023/013186 include techniques where the devices provide neighbor lists to the base station where each neighbor list provides location information related to each neighbor device of the device providing the neighbor list. The location information may be the Global Navigation Satellite System (GNSS) location of each neighbor device or may include data that allows the base station to determine the location. Location information, for example, may include the distance to the neighbor device and a device angle between the base station and the neighbor device. The location information may also include data corresponding to measurements taken by the device reporting the location information of a signal transmitted by the neighbor device. Where adequate location information is received by the base station 112, the base station 112 may not need to measure any signal transmitted by the devices to determine the geographical location. Based on the location information, the base station determines the distance 118. In other examples, the base station 112 may request information from one or both of the devices 102, 108. In still other examples, the base station may determine the location of one or both devices based on measurements of signals received from the device(s). The base station, for example, may use signal strength and Angle of Arrival (AoA) measurements to determine the distance between the uplink-transmitting device and the downlink receiving device.

The downlink-receiving device 102 includes appropriate electronics, code and hardware that provide the capability to the downlink-receiving device 102 to manipulate the receive antenna pattern 104 for the example of FIG. 1A. Accordingly, the antenna 124 has multiple antenna elements or other construction that facilitates receive pattern beamforming or other antenna pattern manipulation or adjustment. The downlink-receiving device 102 may also include digital and/or analog signal processing mechanisms for facilitating receive antenna beamforming. In some situations, receiver weight combiner parameters are applied to signals received through the multiple antenna elements to manipulate the receive antenna pattern 104.

In response to receiving the full duplex information 126 from the base station 112, the downlink-receiving device 102 adjusts the receive antenna pattern 104 such that the receive antenna pattern 104 includes a reception null 105 in the direction 106 of the uplink-transmitting device 108. The receive antenna pattern 104 with the reception null 105 is configured at least for the time when the potential interference from the uplink signal 114 is present. Accordingly, the receive antenna pattern 104 is set to this interference-reducing pattern 104 during the full duplex communication when the downlink-receiving device 102 is receiving the downlink signal in the same channel as the channel being used by the uplink-transmitting device 108 for transmitting signals. The receive antenna pattern 104 is represented in FIG. 1A by a shape illustrating the general reception gain characteristics and does not necessarily represent the actual reception gain that may be established at the downlink-receiving device 102. As discussed below, for example, antenna patterns typically have a main lobe and several sidelobes. The receive antenna pattern 104 is configured such that the reception gain within the reception null 105 is less than at least one other portion of the antenna pattern. For the examples herein, the reception gain in the reception null 105 is at least less than the reception gain in the direction 126 of the base station 112. In some situations, the interference reducing receive antenna pattern may include a lobe 128 in the direction of the base station 112 in addition to the reception null 105. The lobe 128 may have a receive antenna gain greater than all other portions of the receive antenna pattern 104. Accordingly, the receive antenna pattern may include a reception null 105 in the direction 106 of the uplink transmitting device 104 and a lobe 128 in the direction 126 of the base station 112 during transmission of the uplink signal 112 and reception of the downlink signal 116.

Figure 1B:
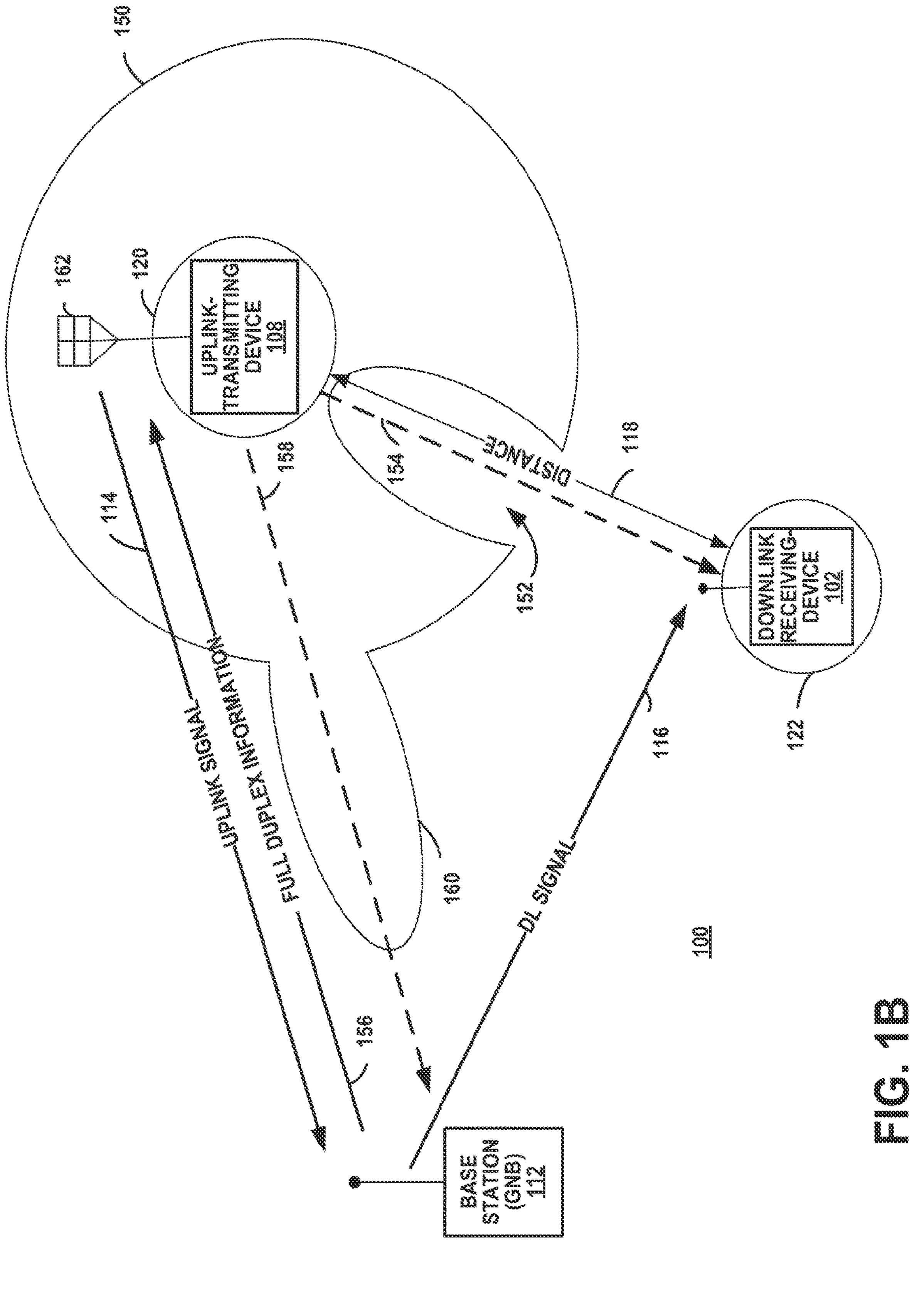
FIG. 1B is a block diagram of an example of the communication system where an uplink-transmitting device adjusts a transmit antenna pattern to have a null in a direction of the downlink-receiving device.

FIG. 1B is a block diagram of an example of the communication system 100 where an uplink-transmitting device 108 adjusts a transmit antenna pattern 150 to have a null 152 in a direction 154 of the downlink-receiving device 102. The uplink-transmitting device 108 receives full duplex information 156 from the base station 112 where the full duplex information 156 at least identifies timing of scheduled downlink transmissions from the base station 112 to the downlink-receiving device 102 where scheduled transmissions from the uplink-transmitting device 108 may interfere. The downlink-receiving device 102 receives at least one downlink signal 116 using the communication resources assigned by the station 112 within the channel. The uplink-transmitting device 108 is scheduled to transmit at least one uplink signal 114 using the same channel used by the downlink-receiving device 102 to receive the at least one downlink signal 116. Therefore, the base station 112 schedules uplink transmission from the uplink-transmitting device 108 and downlink transmission to the downlink-receiving device 102 such that at least one uplink signal will be transmitted from the uplink-transmitting device at the same time and within the same channel as transmission of at least one downlink signal to the downlink-receiving device 102. For the example of FIG. 1B, the base station 112 has access to distance information indicating the distance 118 between the location 120 of the uplink-transmitting device and the location 122 of the downlink-receiving device. In response to determining that the distance is below a minimum distance threshold, the base station 112 transmits the full duplex information 156 to the uplink-transmitting device 108. The full duplex information 156 at least identifies the timing that is used by the downlink-receiving device 102 to receive the downlink signal 116. For the example, the transmission of the of the full duplex information 156 indicates to the uplink-transmitting device 108 that the transmission of the uplink signal 114 may interfere with reception of the downlink signal 116. In some situations, the full duplex information 156 may provide an interference indicator indicating the potential for interference and may identify the downlink communication that may be susceptible to interference. In other situations, the uplink transmitting device may identify the downlink transmissions from information provided by the full duplex information that may be susceptible to interference by uplink transmissions from the uplink-transmitting device.

As discussed above, the base station may track the locations of the devices 102, 108 based on location information provided by the devices 102, 108 in accordance with the techniques described in PCT Patent Application No. PCT/US2023/013186. The base station may also request information from one or both of the devices 102, 108. In still other examples, the base station may determine the location of one or both devices based on measurements of signals received from the device(s).

In response to receiving the full duplex information 156 from the base station 112, the uplink-transmitting device 108 adjusts the transmit antenna pattern 150 such that the transmit antenna pattern 150 includes a null 152 in the direction 154 of the downlink-receiving device 102. The transmit antenna pattern 150 with the null 152 is configured at least for the time when the potential interference to the downlink signal 116 is present. Accordingly, the transmit antenna pattern 150 is set to this interference-reducing transmission pattern during the full duplex communication when the uplink transmitting device 108 is transmitting the uplink signal in the same channel as the channel being used by the downlink-receiving device 102 for receiving downlink signals 116. The transmit antenna pattern 150 is represented in FIG. 1B by a shape illustrating the general transmission gain characteristics and does not necessarily represent the actual transmission gain that may be established at the uplink-transmitting device 108. As discussed below, antenna patterns typically have a main lobe and several minor lobes. The transmit antenna pattern 150 is configured such that the transmission gain within the null 152 is less than at least one other portion of the antenna pattern. For the examples herein, the transmission gain in the null 152 is at least less than the transmission gain in the direction 158 to the base station 112. In some situations, the interference-reducing transmission antenna pattern may include a lobe 160 in the direction 158 of the base station 112 in addition to the null 152. The lobe 160 may have a transmission antenna gain greater than all other portions of the transmission antenna pattern 150. Accordingly, the transmission antenna pattern may include a null 150 in the direction 152 of the downlink-receiving device 102 and a lobe 160 in the direction 158 of the base station 112 during transmission of the uplink signal 114 and reception of the downlink signal 116.

The uplink-transmitting device 108 includes appropriate electronics, code and hardware that provide the capability to the uplink-transmitting device 108 of manipulating the transmission antenna pattern 150. Accordingly, the antenna 162 has multiple antenna elements or other construction that facilitates transmission pattern beamforming or other antenna pattern manipulation or adjustment. The uplink-transmitting device 108 may also include digital and/or analog signal processing mechanisms for facilitating transmission antenna beamforming. In some situations, transmission precoder parameters are applied to signals transmitted through the multiple antenna elements to manipulate the transmit antenna pattern 150.

Figure 1C:
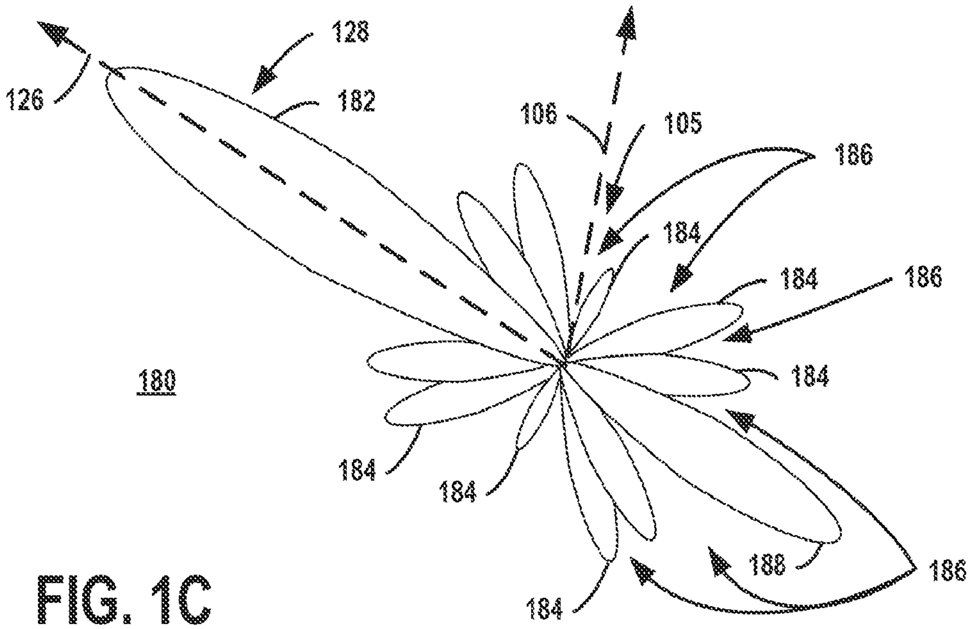
FIG. 1C is an illustration of an example of a reception antenna radiation pattern suitable for use as the receive antenna pattern.

FIG. 1C is an illustration of an example of a reception antenna radiation pattern 180 suitable for use as the receive antenna pattern 104. The downlink-receiving device 102 may establish a receive antenna pattern 104 such as the reception antenna radiation pattern 180 in order to minimize interference during the full duplex communication as discussed above. The reception antenna radiation pattern 180 is a graphical representation of the radiation reception properties of the antenna as a function of space. The reception antenna radiation pattern 180 represents the relative intensity of the receiving energy radiation or the amount of the received electric or magnetic field strength as a function of the direction to the antenna. The reception antenna radiation pattern 180 represents how the antenna receives energy. The reception antenna radiation pattern 180 may be a function of the combination of signal processing, receiver configuration, and antenna element control. The antenna pattern 180 manipulation may be accomplished at the baseband level with digital beamforming, at the analog/RF level with analog beam forming or with hybrid beamforming using both digital and analog beam forming. For the examples herein, a receive antenna pattern may be established and adjusted by controlling the antenna elements of the antenna and/or by controlling the receiver. Control of the receiver may include analog signal processing, digital signal processing, or a combination of both.

For the example of FIG. 1C, the antenna pattern 180 includes a main lobe 182 and a several sidelobes 184 at various angles. The lobes are separated by nulls 186 where the energy approaches zero. The antenna pattern 180 may also have a sidelobe in the opposite direction of the main lobe. The sidelobe in the opposite direction from the main lobe is often referred to as a back lobe 188.

By establishing the reception radiation pattern 180 in a specific orientation and configuration, a reception null 105 can be aligned in the direction 106 of the uplink-transmitting device 108. In addition, the main lobe 182 may provide the lobe 128 in the direction of the base station 112. The radiation pattern 180 shown in FIG. 1C is a horizontal radiation pattern plotted as a function of azimuth about the antenna. The typical radiation pattern of an antenna, however, is three-dimensional and, therefore, also includes a vertical radiation pattern. For the examples herein, therefore, the nulls and lobes have vertical components. In some situations, the reception null 105 may not perfectly align with a null 186 where the reception gain is theoretically zero. Accordingly, the reception null 105 may be within a sidelobe 104 in some circumstances. Nonetheless, the reception gain at the reception null 105 is still less than the reception gain in the direction 126 of the base station 112.

Figure 1D:
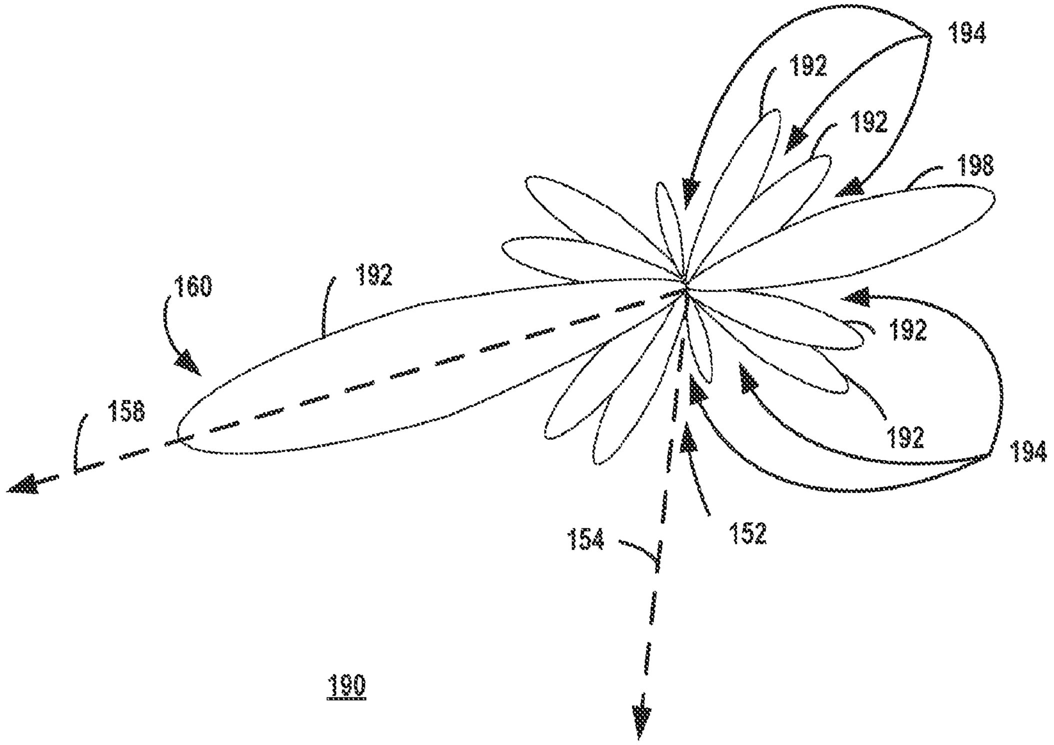
FIG. 1D is an illustration of an example of a transmission antenna radiation pattern suitable for use as the transmit antenna pattern.

FIG. 1D is an illustration of an example of a transmission antenna radiation pattern 190 suitable for use as the transmit antenna pattern 150. The uplink-transmitting device 108 may establish a transmit antenna pattern 150 such as the transmission antenna radiation pattern 190 in order to minimize interference during the full duplex communication as discussed above. The transmission antenna radiation pattern 190 is a graphical representation of the radiation transmission properties of the antenna 162 as a function of space. The transmission antenna radiation pattern 190 represents the relative intensity of the transmitted radiation energy or the amount of the transmitted electric or magnetic field strength as a function of the direction to the antenna. The transmission antenna radiation pattern 190 represents how the antenna transmits energy out into space. The antenna pattern 190 may be a function of the combination of signal processing, receiver configuration, and antenna element control. The antenna pattern 190 manipulation may be accomplished at the baseband level with digital beamforming, at the analog/RF level with analog beamforming or with hybrid beamforming using both digital and analog beam forming. For the examples herein, a transmission antenna pattern may be established and adjusted by controlling the antenna elements of the antenna and/or by controlling the transmitter. Control of the transmitter may include analog signal processing, digital signal processing, or a combination of both.

For the example of FIG. 1D, the antenna pattern 190 includes a main lobe 192 and a several sidelobes 194 at various angles. The lobes are separated by nulls 196 where the energy approaches zero. The antenna pattern 190 may also have a sidelobe in the opposite direction of the main lobe 192. The sidelobe in the opposite direction from the main lobe 192 is often referred to as a back lobe 198.

By establishing the transmission radiation pattern 190 in a specific orientation and configuration, a null 152 can be aligned in the direction 154 of the downlink-receiving device 102. In addition, the main lobe 192 may provide the lobe 160 in the direction of the base station 112. The radiation pattern 190 shown in FIG. 1D is a horizontal radiation pattern is plotted as a function of azimuth about the antenna. The typical transmission pattern of an antenna is three-dimensional and, therefore, also includes a vertical radiation pattern. For the examples herein, therefore, the nulls and lobes have vertical components. In some situations, the null 152 may not perfectly align with a null 196 where the transmission gain is theoretically zero. Accordingly, the null 154 may be within a sidelobe 194 in some circumstances. Nonetheless, the transmission gain at the null 154 is still less than the transmission gain in the direction 158 of the base station 112.

As discussed above, therefore, interference at the downlink-receiving device 102 may be accomplished by adjusting the receive antenna pattern 104 at the downlink-receiving device 102 or adjusting the transmit antenna pattern 150 at the uplink-transmitting device 108. In some situations, both antenna patterns 104, 150 are be adjusted.

Figure 2A:
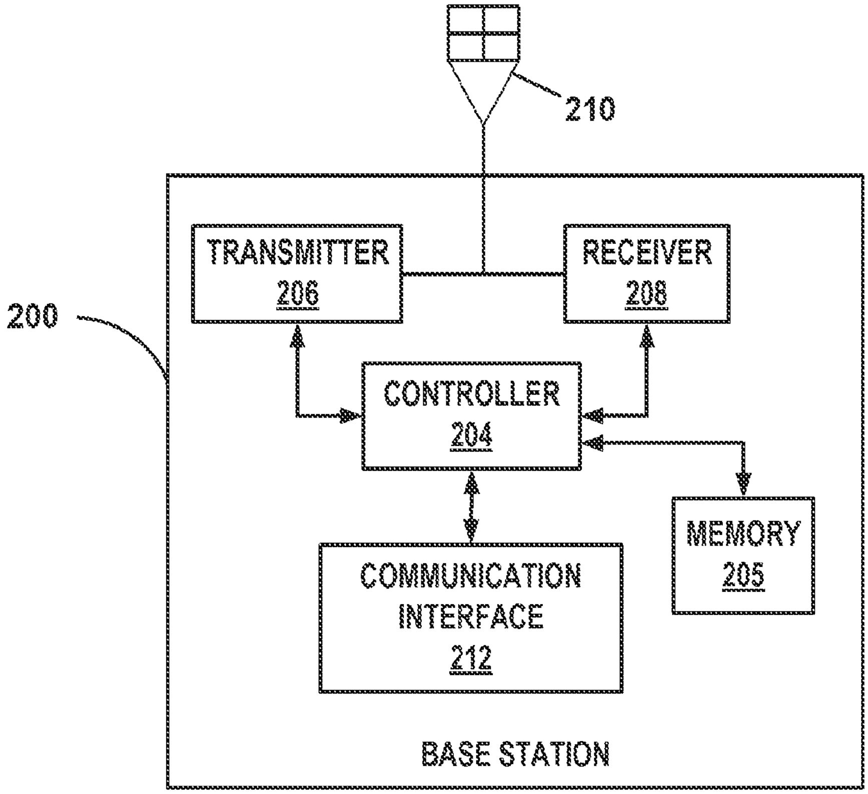
FIG. 2A is a block diagram of an example of a base station suitable for use as the base station in the techniques discussed herein.

FIG. 2A is a block diagram of an example of a base station 200 suitable for use as the base station 112. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base station 112 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location. Further, the base station 200 may be an IAB donor. As discussed below with reference to FIG. 2B, an IAB donor communicates with IAB nodes which in turn provide service to UE devices. In some situations, an IAB donor may be providing service to a UE device through multiple IAB nodes communicatively connected in series.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory 205. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. For the examples herein, the antenna 210 includes multiple transmit and receive antennas to allow for performing AoA measurements.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations or the network. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 2B:
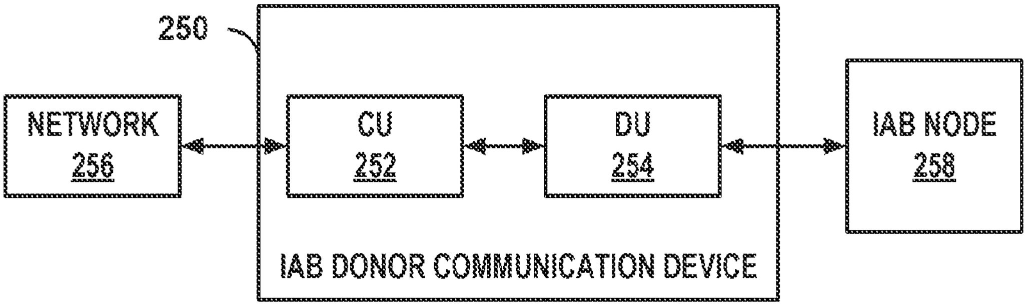
FIG. 2B is a block diagram of an example of an Integrated Access and Backhaul (IAB) donor communication device suitable for use as each of the base stations in the techniques discussed herein.

FIG. 2B is a block diagram of an example of an Integrated Access and Backhaul (IAB) donor communication device 250 suitable for use as each of the base stations 112, 200 in the techniques discussed herein. The IAB donor 250 at least includes the components of the base station 200 discussed above with reference to FIG. 2A and may include additional components, hardware, electronics, firmware, and/or software to facilitate the functions of an IAB donor. IAB systems provide a wireless backhaul where the wireless communication links use the same frequencies employed by UE devices. In some situations, dedicated frequencies may be used. The IAB donor 250 includes a central unit (CU) that interfaces with the network 254 and a distributed unit (DU) 256 that interfaces with one or more IAB nodes 258. In some situations, a single IAB system with one or more IAB nodes and a IAB donor are considered to be a single gNodeB (gNB). IAB donors terminate the backhaul traffic from distributed IAB nodes which can be backhaul endpoints or may be relay devices between backhaul endpoints and an IAB donor. In most situations, IAB donors and IAB nodes also serve mobile UE devices in accordance with known techniques.

Figure 3A:
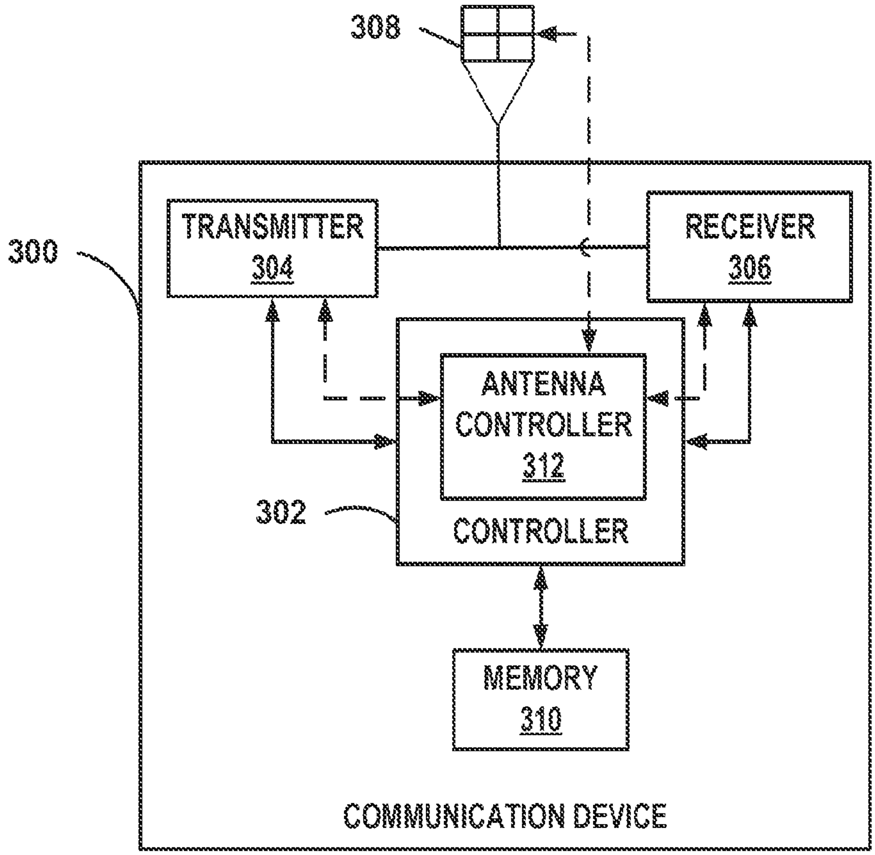
FIG. 3A is a block diagram of an example of a communication device suitable for use as each of the communication devices in the techniques discussed herein.

FIG. 3A is a block diagram of an example of a communication device 300 suitable for use as each of the communication devices 102, 108. In some examples, the communication device 300 is any user equipment (UE) wireless communication device such as a mobile phone, a transceiver modem, a personal digital assistant (PDA), a tablet, or a smartphone. In other examples, the communication device 300 is a machine type communication (MTC) communication device or Internet-of-Things (IOT) device. The communication 300 may also be an IAB node communication device such as the IAB node 258 discussed above. The communication device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and/or receive antennas. Multiple receive antennas facilitate AoA measurements. The antenna 308, therefore, may be an AoA capable antenna. In some situations, the antenna 308 may function as the antenna 124 and/or the antenna 162.

The UE device 300 may include appropriate electronics, code and hardware that provide the capability to the UE device 300 of manipulating the receive antenna pattern 104 and/or the transmit antenna pattern 150. Accordingly, the controller 302 may include, or be connected to, antenna controller 312 that can control a receive antenna pattern, transmit antenna pattern, or both. The antenna 308, therefore, may be an antenna 124 as discussed above and may have multiple antenna elements or other construction that facilitates receive pattern beamforming or other antenna pattern manipulation or adjustment. With the appropriate antenna and electronics including a sufficient antenna controller 312, the UE device 300 is an example of the downlink-receiving device 102. The antenna 308, may also be an antenna 162 as discussed above and may have multiple antenna elements or other construction that facilitates transmit pattern beamforming or other antenna pattern manipulation or adjustment. With the appropriate antenna and electronics including a sufficient antenna controller 312, the UE device 300 is an example of the uplink-transmitting device 108. The connections from the antenna controller 312 to the transmitter 304, receiver 306 and antenna 308 are illustrated with dashed lines to indicate that direct connection or control may not be available to each component in some circumstances.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 3B:
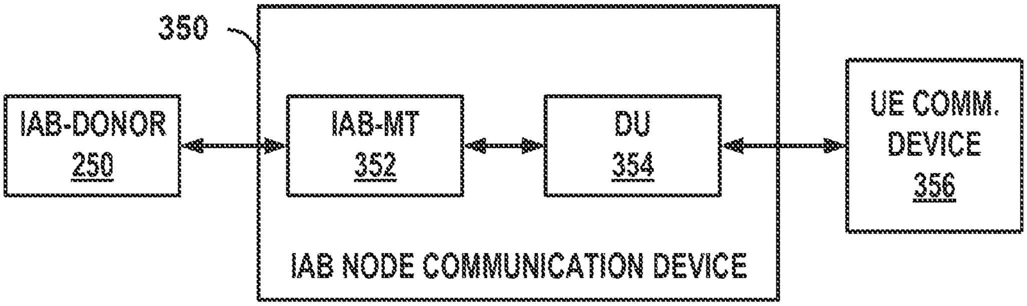
FIG. 3B is a block diagram of an example of an Integrated Access and Backhaul (IAB) node communication device suitable for use as each of the communication devices in the techniques discussed herein.

FIG. 3B is a block diagram of an example of an Integrated Access and Backhaul (IAB) node communication device 350 suitable for use as each of the communication devices 102, 108 and the IAB node 258 in the techniques discussed herein. The IAB node 350 at least includes the components of the communication device 300 discussed above with reference to FIG. 3A and may include additional components, hardware, electronics, firmware, and/or software to facilitate the functions of an IAB node.

The IAB node 350 includes a IAB Mobile Termination (MT) 352 that interfaces win a IAB donor 250 and a DU 354 that interfaces with a UE communication 356 or another IAB node 258 (350). The IAB MT antenna is either an independent set of arrays (IAB-MT) or the same antenna used for access and is referred to as a virtual IAB-MT (vIAB-MT) in some situations.

Figure 4A:
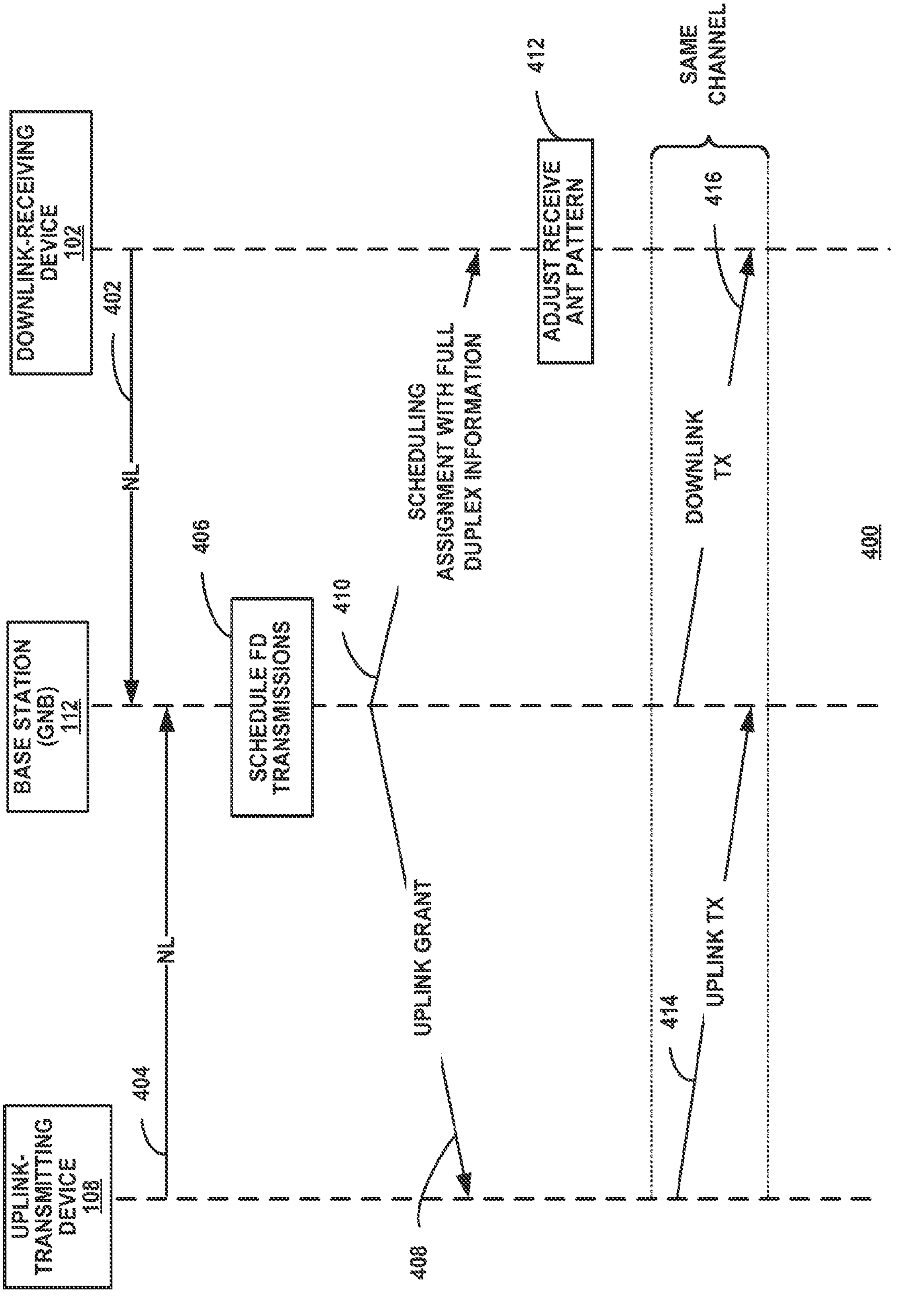
FIG. 4A is a messaging diagram for an example where full duplex information is provided to the downlink receiving UE device.

FIG. 4A is a messaging diagram 400 for an example where full duplex information is provided to the downlink-receiving device 102. FIG. 4A depicts the control and data messages that are transmitted between the downlink-receiving device 102, the uplink-transmitting device 108, and the serving base station 112. In the interest of clarity and brevity, not all of the messages that are transmitted between the devices are included in FIG. 4A. Moreover, one or more of the messages that are shown in FIG. 4A may be omitted. Likewise, additional messages may be included beyond those shown in FIG. 4A that facilitate interference reduction during full duplex communication.

At transmission 402, the downlink-receiving device 102 sends a neighbor list (NL) to the base station (gNB) 112. The NL message is an example of a transmission of location information from the communication device to the base station 112 and includes location information for each neighbor device of the downlink-receiving device 102.

At transmission 404 the uplink-transmitting device 108 sends a neighbor list (NL) to the base station (gNB) 112. The NL message is an example of a transmission of location information from the communication device 108 to the base station 112 and includes location information for each neighbor device of the uplink-transmitting device 102. In some situations, one of the two NL transmissions 402, 404 is omitted.

The transmissions 402, 404 may be sent in response to a request from the base station 112, based on a predetermined schedule, when a trigger occurs, or autonomously. For example, a communication device may send a NL when there is change in the NL.

At event 406, the base station (gNB) 112 schedules the full duplex transmissions for the two communication devices 102, 108. The base station 112 schedules the transmission of downlink signal 116 to the downlink-receiving device 102 and the transmission of the uplink signal 114 from the uplink-transmitting device 108 where the transmissions are scheduled for the same channel and at the same time.

At transmission 408, the base station 112 sends an uplink grant to the uplink-transmitting device 108. The uplink grant identifies the uplink communication resources that should be used to transmit the uplink signal 114.

At transmission 410, the base station sends a downlink scheduling assignment to the downlink-receiving device 102. The scheduling assignment identifies the downlink communication resources that will be used to transmit the downlink signal 116 to the downlink-receiving device 102. For the example, the downlink scheduling assignment also includes full duplex information 110 where the information includes at least the timing of the scheduled uplink signal 114 transmission and device identifier such as a UE identifier identifying the uplink-transmitting device 108. Some examples of UE identifiers include a C-RNTI (RRC CONN UE ID), a S-TMSI (IDLE UEs), a I-RNTI (INACTIVE UEs) and a L2 UE_ID (application layer UE ID for use in D2D). Accordingly, the transmission 410 is an example of the transmission of the full duplex information 110 of FIG. 1A.

At event 412, the downlink-receiving device 102 adjusts the receive antenna pattern 104 to minimize, or at least reduce, interference from the uplink signal 114 with the downlink signal 116. For the example, the downlink-receiving device 102 uses the stored location information of the uplink-transmitting device 108 to at least create a reception null 105 in the direction of the uplink-transmitting device 108. In some situation, the base station 112 provides location information that may assist the downlink-receiving device 102 in adjusting the receive antenna pattern 104. The downlink-receiving device 102 established the interference-reducing receive antenna pattern for at least the time when the uplink signal 114 and the downlink signal 116 are transmitted.

At transmission 414, the uplink signal 114 is transmitted and, at transmission 416, the downlink signal 116 is transmitted. The uplink signal 114 and downlink signal 116 are transmitted in the same time slot(s) and within the same channel. The interference-reducing receive antenna pattern 104 mitigates the interference of the uplink signal 114 with the downlink signal 116 at the downlink-receiving device 102.

Figure 4B:
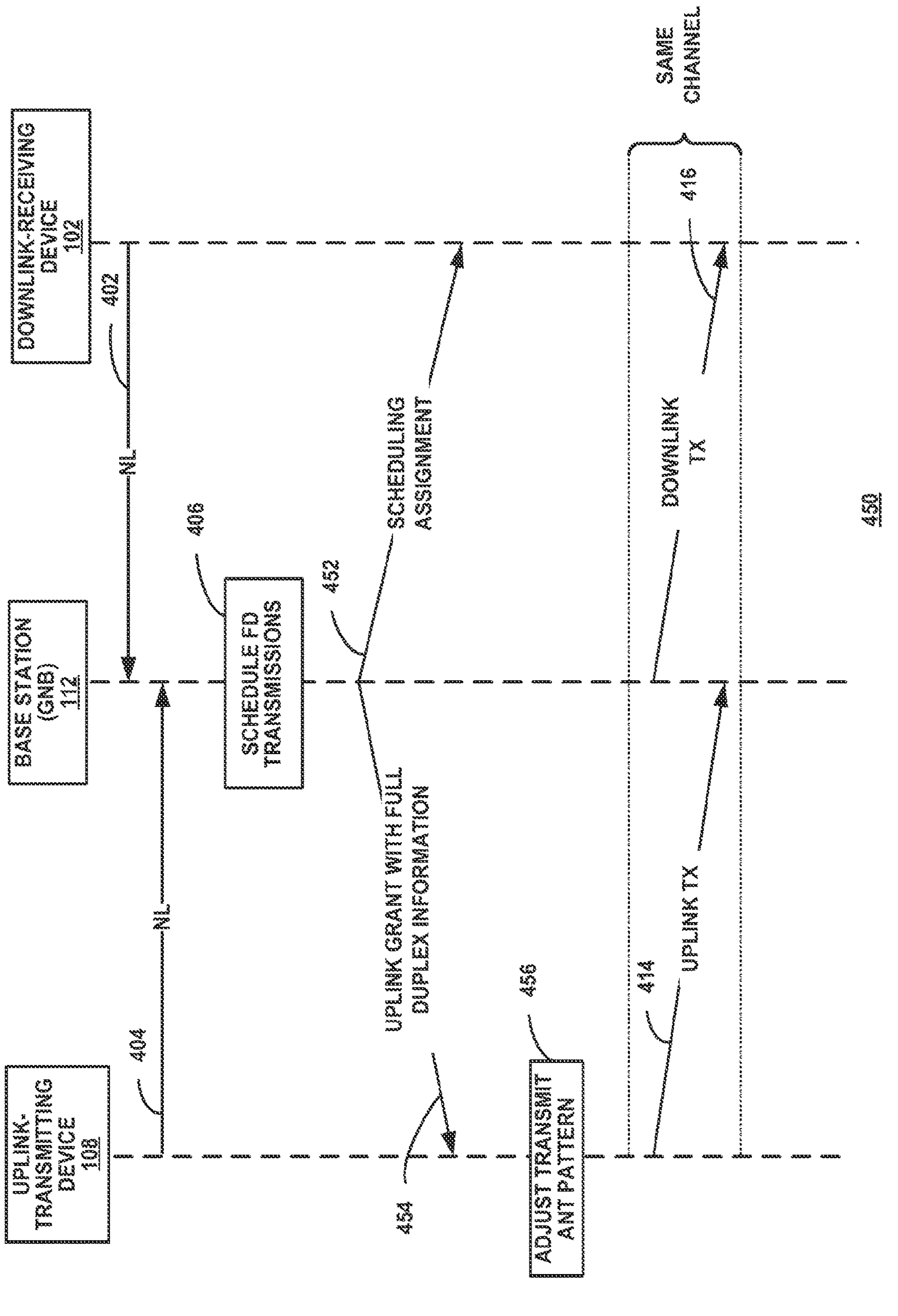
FIG. 4B is a messaging diagram for an example where full duplex information is provided to the uplink-transmitting device.

FIG. 4B is a messaging diagram 400 for an example where full duplex information is provided to the uplink-transmitting device 108. FIG. 4B depicts the control and data messages that are transmitted between the downlink-receiving device 102, the uplink-transmitting device 108 and serving base station 112. In the interest of clarity and brevity, not all of the messages that are transmitted between the devices are included in FIG. 4B. Moreover, one or more of the messages that are shown in FIG. 4B may be omitted. Likewise, additional messages may be included beyond those shown in FIG. 4B that facilitate interference reduction during full duplex communication.

At transmission 402, the downlink-receiving device 102 sends a neighbor list (NL) to the base station (gNB) 112. The NL message is an example of a transmission of location information from the communication device to the base station 112 and includes location information for each neighbor device of the downlink-receiving device 102.

At transmission 404 the uplink-transmitting device 108 sends a neighbor list (NL) to the base station (gNB) 112. The NL message is an example of a transmission of location information from the communication device 108 to the base station 112 and includes location information for each neighbor device of the uplink-transmitting device 102. In some situations, one of the two NL transmissions 402, 404 is omitted.

The transmissions 402, 404 may be sent in response to a request from the base station 112, based on a predetermined schedule, when a trigger occurs, or autonomously. For example, a communication device may send a NL when there is change in the NL.

At event 406, the base station (gNB) 112 schedules the full duplex transmissions for the two communication devices 102, 108. The base station 112 schedules the transmission of downlink signal 116 to the downlink-receiving device 102 and the transmission of the uplink signal 114 from the uplink-transmitting device 108 where the transmissions are scheduled for the same channel and at the same time.

At transmission 452, the base station 112 sends a downlink scheduling assignment to the downlink-receiving device 102. The downlink scheduling assignment identifies the downlink communication resources that will be used to transmit the downlink signal 116.

At transmission 454, the base station 112 sends an uplink grant to the uplink-transmitting device 109. The uplink grant identifies the uplink communication resources that should be used to transmit the uplink signal 114 to the base station 112. For the example, the uplink grant also includes full duplex information 156 where the information includes at least the timing of the scheduled downlink signal 116 transmission and a device identifier (such a UE identifier) identifying the downlink-receiving device 102. Accordingly, the transmission 454 is an example of the transmission of the full duplex information 156 of FIG. 1B.

At event 456, the uplink-transmitting device 108 adjusts the transmit antenna pattern 150 to minimize, or at least reduce, interference from the uplink signal 114 with the downlink signal 116. For the example, the uplink-transmitting device 108 uses the stored location information of the downlink-receiving device 102 to at least create a null 152 in the direction 154 of the downlink-receiving device 102. In some situation, the base station 112 provides location information that may assist the uplink-transmitting device 108 in adjusting the transmit antenna pattern 150. The uplink-transmitting device 108 establishes the interference-reducing transmit antenna pattern 150 for at least the time when the uplink signal 114 and the downlink signal 116 are transmitted.

At transmission 414, the uplink signal 114 is transmitted and, at transmission 416, the downlink signal 116 is transmitted. The uplink signal 114 and downlink signal 116 are transmitted in the same time slot(s) and within the same channel. The interference-reducing transmit antenna pattern 150 mitigates the interference of the uplink signal 114 with the downlink signal 116 at the downlink-receiving device 102.

Figure 5:
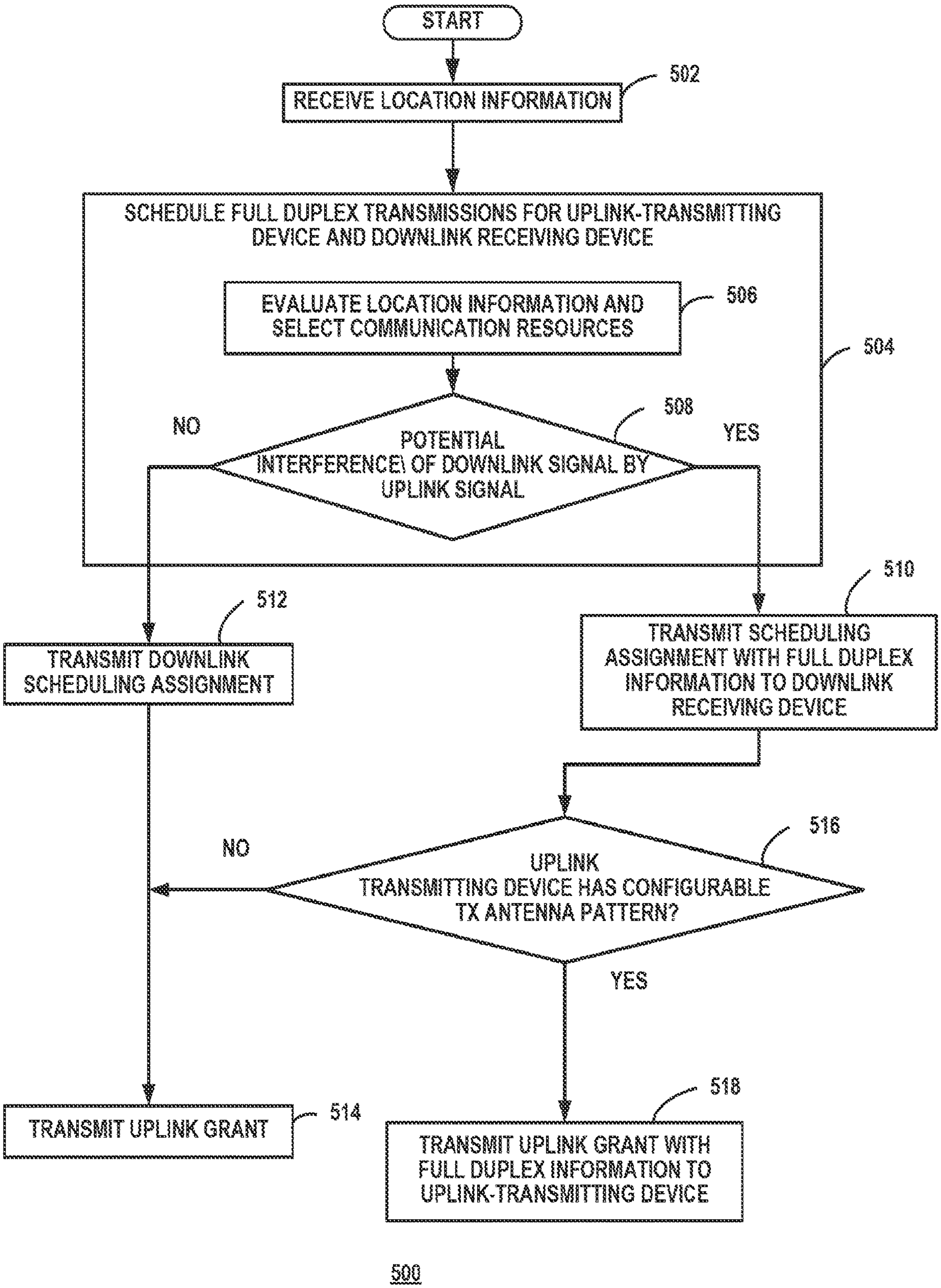
FIG. 5 is a flow chart of an example of method of managing full duplex communication to reduce interference at a downlink receiving UE device.

FIG. 5 is a flow chart of an example of method of managing full duplex communication to reduce interference at a downlink-receiving device 102. The method may be formed at a base station, eNodeB, gNodeB or other device providing communication service to UE devices or IAB nodes within a geographical area. Accordingly, the method may be performed by the base station 112. The steps of the method may be performed in a different order and some steps may be performed simultaneously in some situations. One or more steps may be omitted in some situations and the method may include additional steps.

At step 502, the location information is received from at least one communication device. For the example, the base station receives NLs from a downlink-receiving device 102 and an uplink-transmitting device 108. The base station 112 stores the location information and updates the information as updates are provide by one or more communication devices.

At step 504, the full duplex transmissions are scheduled. The base station 112 selects the communication resources for uplink transmission from the uplink-transmitting device 108 and for downlink transmissions to the downlink-receiving device 102. For the example, the base station 112 evaluates the location information when selecting the resources at step 506 and determines the potential for interference of the downlink signal 116 by the uplink signal 114 at the downlink-receiving device 102 at step 508. After determining the distance between the two communication devices 102, 108, the base station 112 compares the distance to a threshold distance. Where the distance is less than the threshold distance, the base station 112 determines that a potential for interference exists with the scheduled resources. The base station may evaluate numerous factors in scheduling the transmission and may avoid scheduling resources that are more likely to result in interference. In some circumstances, however, the resources are selected that may result in interference in order to meet other scheduling criteria. In the interest of increasing communication traffic and capacity, for example, full duplex communication scheduling may be selected that is likely to result in interference without antenna pattern interference mitigation discussed herein. Scheduling may also take into account the capabilities of the communication devices. If it is determined that there is a potential for interference, the method proceeds at step 510. Otherwise, the method continues at step 512.

At step 512, a downlink scheduling assignment is transmitted to the downlink-receiving device 102. The downlink scheduling assignment identifies the communication resources that will be used to transmit the downlink signal to the downlink-receiving device 102.

At step 514, an uplink grant is transmitted to the uplink-transmitting device 108. The uplink grant identifies the communication resources that should be used by the uplink-transmitting device to transmit the uplink signal to the base station 112.

At step 510, a scheduling assignment with full duplex information is transmitted to the downlink-receiving device 102. The scheduling assignment identifies the communication resources that will be used to transmit the downlink signal to the downlink-receiving device 102. The downlink scheduling assignment also at least identifies the uplink-transmitting device and provides the timing of the uplink signal 114.

At step 516, it is determined whether the uplink-transmitting device 108 has the capability to configure the transmission antenna pattern. The capabilities of the uplink-transmitting device may be provided to the base station in uplink control messages in some situations. If the uplink-transmitting device 108 has the capability to configure the transmission antenna pattern, the method proceeds to step 518. Otherwise, the method continues at step 514. In some situations, step 516 can be omitted and the method proceeds from step 510 to step 518. In other situations, step 516 can be omitted and the method proceeds from step 510 to step 514. In still other situations, steps 516 and 518 are both omitted.

At step 518, an uplink grant with full duplex information is transmitted to the uplink-transmitting device 108. The uplink grant identifies the communication resources that should be used to transmit the uplink signal 114 to the base station 112. The uplink grant with full duplex information also at least identifies the downlink-receiving device and provides the timing of the downlink signal 116.

Figure 6A:
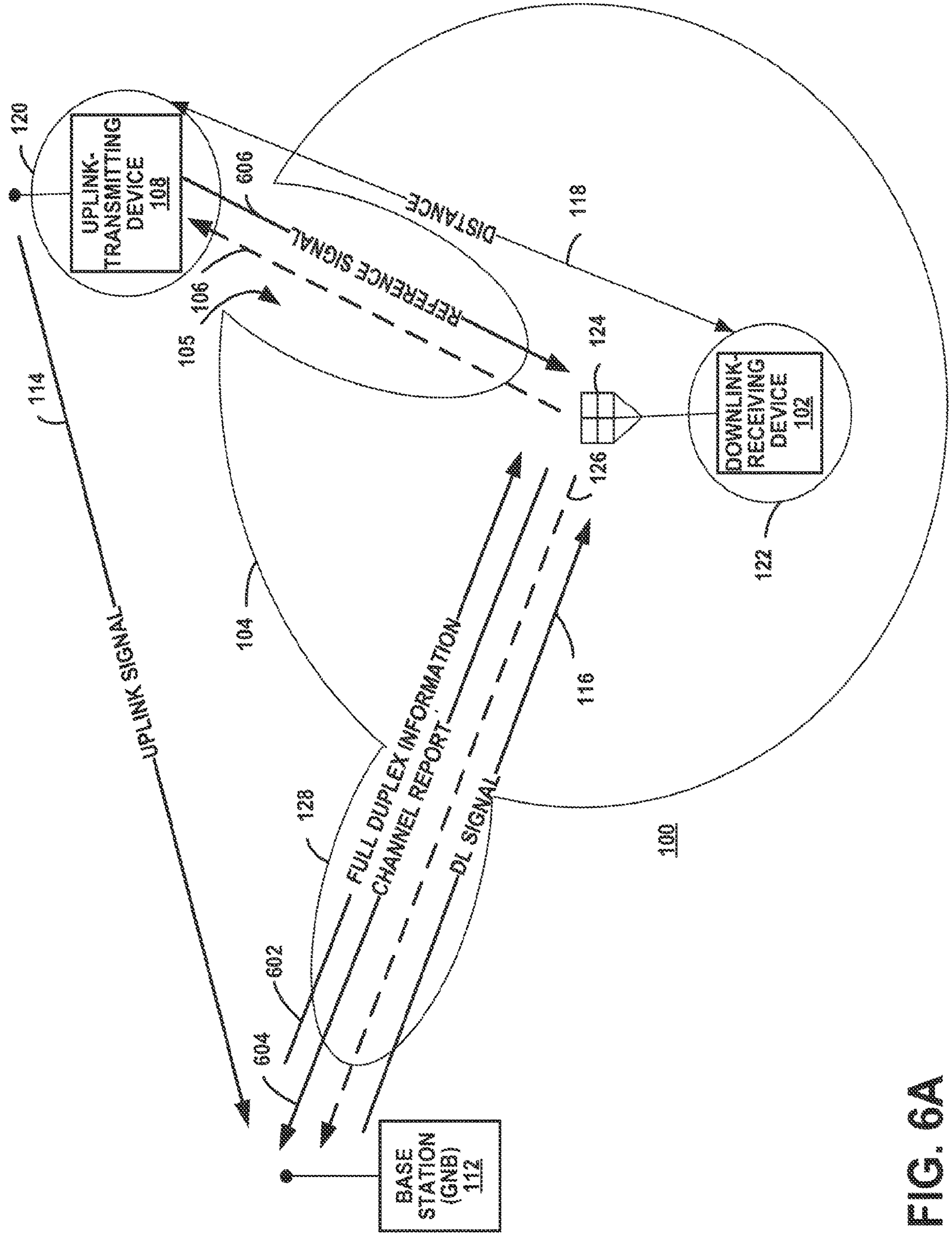
FIG. 6A is a block diagram of an example of the communication system where the base station receives channel state information to generate the full duplex information and the downlink-receiving device adjusts the receive antenna pattern to have a reception null in the direction of the uplink-transmitting device based on the full duplex information.

FIG. 6A is a block diagram of an example of the communication system 100 where the base station 112 receives channel state information to generate the full duplex information 602 and the downlink-receiving device 102 adjusts the receive antenna pattern 104 to have a reception null 105 in the direction 106 of the uplink-transmitting device 108 based on the full duplex information 602. The downlink-receiving device 102 receives the full duplex information 602 from the base station 112 where the full duplex information 602 at least provides antenna parameters for adjusting the receive antenna pattern and identifies the transmission timing of the uplink transmission from the uplink-transmitting device 108 to the base station 112. For the example, the full duplex information 602 identifies the uplink-transmitting device 108. As discussed above, the uplink-transmitting device 108 transmits at least one uplink signal 114 at the timing assigned by the station 112 within a channel. The downlink-receiving device 102 is scheduled to receive at least one downlink signal 116 using the same channel used by the uplink-transmitting device 108 to transmit the at least one uplink signal 114. Therefore, the base station 112 schedules uplink transmission from the uplink-transmitting device 108 and downlink transmission to the downlink-receiving device 102 such that at least one uplink signal will be transmitted from the uplink-transmitting device at the same time and within the same channel as transmission of at least one downlink signal to the downlink-receiving device 102.

As discussed herein, the channel is any frequency bandwidth where the energy of the downlink transmission at least partially overlaps with the energy of the uplink transmission. The channel may be a channel assigned by the base station and/or specified by a communication specification. In some situations, one or both of the uplink transmission and the downlink transmission occupy the entire channel bandwidth. In other situations, the channel includes a plurality of sub-bands where the uplink transmission and downlink transmission may be within the same sub-band or within different sub-bands. Where the transmissions are within different sub-bands, however, the energy of the uplink transmission within the sub-band containing the downlink transmission is sufficiently high to at least potentially cause interference at the downlink-receiving device. At the location of the downlink-receiving device 102, therefore, some of the energy of the uplink signal transmitted in one sub-band overlaps with the energy of the downlink signal transmitted in another sub-band. In some situations, the energy of the uplink signal 114 may be within the sub-band used for transmitting the downlink signal 116 even though the two signals are transmitted within different sub-bands.

The base station 112 receives channel state information from at least one of the two communication devices 102, 108. For the example of FIG. 6A, the downlink-receiving device 102 transmits a channel report 604 that at least includes channel state information about the channel between the downlink-receiving device 102 and the uplink-transmitting device 108. A reference signal 606 transmitted from the uplink-transmitting device 108 is measured or otherwise evaluated to generate the channel report 604.

Based at least partially on the channel report 604, the base station 112 generates and transmits full duplex information 602 to the downlink-receiving device 102. The downlink-receiving device 102 applies the full duplex information 602 to adjust the antenna pattern 104 and create a reception null 105 in the direction 106 of the uplink-transmitting device 108.

The channel report includes information that allows the base station to determine antenna parameters to be applied at the downlink-receiving device to reduce interference due to transmissions from the uplink-transmitting device. The channel report at least includes a received power indicator indicating the received power of the reference signal and a device angle between the direction of the uplink-transmitting device and the direction of the base station. The device angle, therefore, indicates the direction 106. As discussed below with reference to FIG. 6C, the device angle may be based on angle of arrival (AoA) measurements taken by the downlink-receiving device 102. The CSI report may include a preferred precoder per sub-band (implicit) or explicit channel state, rank indicator, CQI, and other information. The channel report may also include other information such as the geographical location. For the example, the channel report is a Sidelink Channel State Information (SL-CSI) report in accordance with at least one revision of the 3GPP communication specification.

The reference signal 606 may be any signal transmitted from the uplink-transmitting device 108 that provides an indication of the channel between the two communication devices 102, 108. In some examples, the reference signal is a Sidelink Channel State Information Reference Signal (SL-CSI-RS) that is typically used in conventional systems for measuring channel state information between device-to-device (D2D) capable UE devices. In other examples, the reference signal is a D2D discovery signal and measured as SD-RSRP. In another example, if the UE devices 102 and 108 are PC5-RRC connected and are communicating with one another, the channel report 604 may be based on SL-RSRP. In the example, the downlink-receiving device receives the reference signal and generates the channel report based on measurements of the signal. In some situations, the channel report may be transmitted by a device other than the device receiving the reference signal. In one scenario, for example, the downlink-receiving device 102 transmits a reference signal that is measured by the uplink-transmitting device 108. The uplink-transmitting device 108 sends a feedback message to the downlink-receiving device 102 which provides the data for the channel report that is then transmitted by the downlink-receiving device 102 to the base station 112.

The transmission of the channel report may be in response to a request from the base station, a periodic transmission, or in response to a trigger event. Where the transmission is periodic or in response to a trigger event, the criteria for transmission may be preconfigured and/or may be dynamically configured by the base station 112.

For the examples discussed with reference to FIG. 6A and FIG. 6B, the channel reporting is performed using a modified CSI reporting procedure. In some conventional systems, SL-RSRP measurements may be configured by the base station 112 and reported to the base station 112 where the reporting techniques are used for supporting V2X communication over PC5 link or relay UE device selection (i.e., if a candidate relay UE device has a link above a configured threshold). An example of a conventional technique is described in the Rel-17 Radio Resource Control (RRC) (TS 38.331) where the triggering of a report is configured based on event triggers ("EventX2" (Serving L2 U2N Relay UE becomes worse than threshold) and "EventY2 (Candidate L2 U2N Relay UE becomes better than threshold)). The conventional reporting, therefore, is based on event triggering and the events "EventX2" and "EventY2" are used for supporting relay UE selection. For at least some of the examples herein, a full duplex event trigger is supported in addition to the relay event triggers where the full duplex event trigger is specifically directed to reporting of SL-RSRP of the neighboring UE devices for the purpose of full duplex communication management.

In the examples, the base station 112 prioritizes using orthogonal resources in different sub-bands during communication with the two UE devices 102, 108 over non-orthogonal resources. Where use of full duplex communication over the same channel at the same time may provide advantages, however, the base station 112 evaluates the channel report in managing resources and scheduling transmissions. The base station 112 may evaluate other factors in addition to the channel report when managing full duplex communication. The base station may evaluate the QoS (PQI) of the services of the one or both of the UE devices 102, 108. Latency due to excess HARQ retransmissions may be also taken into consideration.

In some situations, a CSI report indicating the SL-RSRP for the channel between the UE devices 102, 108 is below a minimum SL-RSRP threshold indicates to the base station 112 that full duplex communication may be implemented without antenna pattern adjustment. In such situations, the base station 112 schedules full duplex communication without antenna pattern adjustments to mitigate interference. In certain situations, the base station 112 may determine that full duplex communication can be scheduled if antenna pattern manipulation can adequately reduce interference. For example, if the SL-RSRP is below the minimum threshold but above an antenna adjustment threshold, the base station 112 may schedule the full duplex communication and provide the downlink-receiving device with information to adjust the antenna pattern 104 to reduce interference from the full duplex transmissions from the uplink-transmitting device.

In conventional systems, the SL-RSRP measurement is only available if the uplink-transmitting device 108 is transmitting side link traffic or side link control information. In some situations, a discovery signal is used to measure SD-RSRP. Where the downlink-receiving device 102 is configured to perform SD-RSRP measurements from the uplink-transmitting device 108, the downlink-receiving device 102 may send a Model B discovery query to the uplink-transmitting device 108. The Model B discovery query prompts the uplink-transmitting device 108 to send a Model B response. In some examples of this situation, the contents of Model B discovery query message include a measurement purpose indicator indicating that the discovery message is for measuring SD-RSRP. Since the Model B request in conventional systems is interpreted as a request for relay service, the uplink-transmitting device 108 does not always respond with a discovery message. With conventional techniques, therefore, a Model B discovery query does not guarantee a Model B response message even if the UE device adequately received the query. If the UE device receiving the Model B request is not currently available for providing relay service, for example, the UE device may not transmit the discovery signal in response to the Model B request. The measurement purpose indicator in the examples herein, however, indicates that the Model B request is not a request for relay service but rather for full duplex management. As a result, the uplink-transmitting device transmits the discovery signal (reference signal) even though it is not available for relay functions.

In some situations, the two UE devices 102, 108 are connected over a PC5 link and frequent SL-RSRP measurements are performed for full duplex communication purposes. In addition to the sidelink connection between the two UE devices 102, 108, each UE device may also have other simultaneous services via the base station 112.

The base station 112 may evaluate other factors in addition to the channel report when managing full duplex communication. As noted above, the base station 112 may evaluate the QoS (PQI) of the services of the one or both of the UE devices 102, 108. Latency due to excess HARQ retransmissions may also be taken into consideration.

Figure 6B:
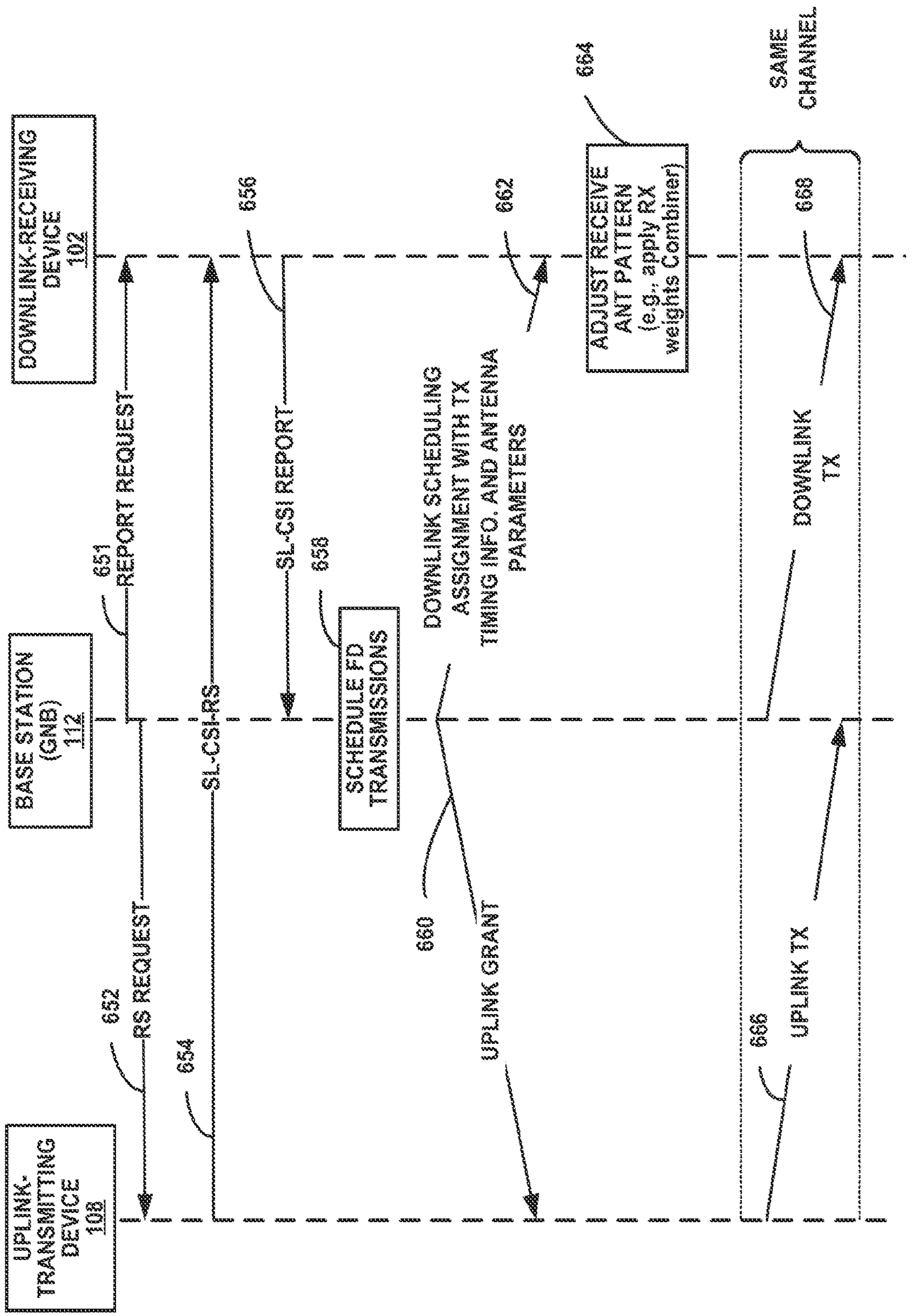
FIG. 6B is a messaging diagram for an example where a sidelink channel report is provided to the base station and full duplex information is provided to the downlink receiving UE device.

FIG. 6B is a messaging diagram 650 for an example where a sidelink channel report is provided to the base station 112 and full duplex information is provided to the downlink-receiving device 102. FIG. 6B depicts the control and data messages that are transmitted between the downlink-receiving device 102, the uplink-transmitting device 108 and serving base station 112. In the interest of clarity and brevity, not all of the messages that are transmitted between the devices are included in FIG. 6B. Moreover, one or more of the messages that are shown in FIG. 6B may be omitted. Likewise, additional messages may be included beyond those shown in FIG. 6B that facilitate interference reduction during full duplex communication.

At transmission 651, the base station 112 sends a report request to initiate a channel state information procedure to obtain information regarding the sidelink channel between downlink-receiving device 102 and the uplink-transmitting device 108. For the example, the report request instructs the downlink-receiving device 102 to receive a SL-CSI-RS over the sidelink channel from the uplink transmitting device 108. For the example, the base station also sends a reference signal (RS) request to the uplink-transmitting device 108 at transmission 652. The RS request instructs the uplink-transmitting UE device to transmit the reference signal to the downlink-receiving device 102. Examples of suitable messages that can be used to convey the RS request include RRC, MAC CE and DCI messages. In some situations, the RS request transmission 652 is omitted. In such situations, signaling between the two devices 102, 108 may facilitate transmission of the reference signal.

At transmission 654, the uplink-transmitting device 108 sends a SL-CSI RS which is received by the downlink-receiving device 102 over the sidelink channel. The SL-CSI RS is an example of a reference signal 606 discussed above.

At transmission 656, the downlink-receiving device 102 sends a SL CSI report to the base station 112. The SL CSI report is an example of the channel report 604. After measuring the channel based on the SL CSI RS, the downlink-receiving device 102 generates and sends the CSI report.

In situations where reciprocity applies to the sidelink channel, transmissions 652, 654, 656 may be directed to and from different UE device in some situations. For example, transmission 652 may be received by the downlink-receiving device 102 which then transmits the SL CSI RS to the uplink-transmitting device 108 at transmission 654. The CSI report can then be sent by the uplink-transmitting device 108 at transmission 656.

At event 658, the base station (gNB) 112 schedules the full duplex transmissions for the two UE devices 102, 108. The base station 112 schedules the transmission of downlink signal 116 to the downlink-receiving device 102 and the transmission of the uplink signal 114 from the uplink-transmitting device 108 where the transmissions are scheduled for the same channel and at the same time.

At transmission 660, the base station 112 sends an uplink grant to the uplink-transmitting device 108. The uplink grant identifies the uplink communication resources that should be used to transmit the uplink signal 114.

At transmission 662, the base station sends a downlink scheduling assignment to the downlink-receiving device 102. The scheduling assignment identifies the downlink communication resources that will be used to transmit the downlink signal 116 to the downlink-receiving device 102. For the example, the downlink scheduling assignment also includes full duplex information 110 where the information includes at least the timing of the scheduled uplink signal 114 transmission and receiver weight combiner parameters. Accordingly, the transmission 662 is an example of the transmission of the full duplex information 602 of FIG. 6A.

At event 664, the downlink-receiving device 102 adjusts the receive antenna pattern 104 to minimize, or at least reduce, interference from the uplink signal 114 with the downlink signal 116. For the example, the downlink-receiving device 102 applies the receiver weight combiner parameters received from the base station 112 to establishes a receive antenna pattern 104 that at least includes a reception null 105 in the direction 106 of the uplink-transmitting device 108. The downlink-receiving device 102 established the interference-reducing receive antenna pattern for at least the time when the uplink signal 114 and the downlink signal 116 are transmitted.

At transmission 666, the uplink signal 114 is transmitted and, at transmission 668, the downlink signal 116 is transmitted. The uplink signal 114 and downlink signal 116 are transmitted in the same time slot(s) and within the same channel. The interference-reducing receive antenna pattern 104 mitigates the interference of the uplink signal 114 with the downlink signal 116 at the downlink-receiving device 102.

Figure 6C:
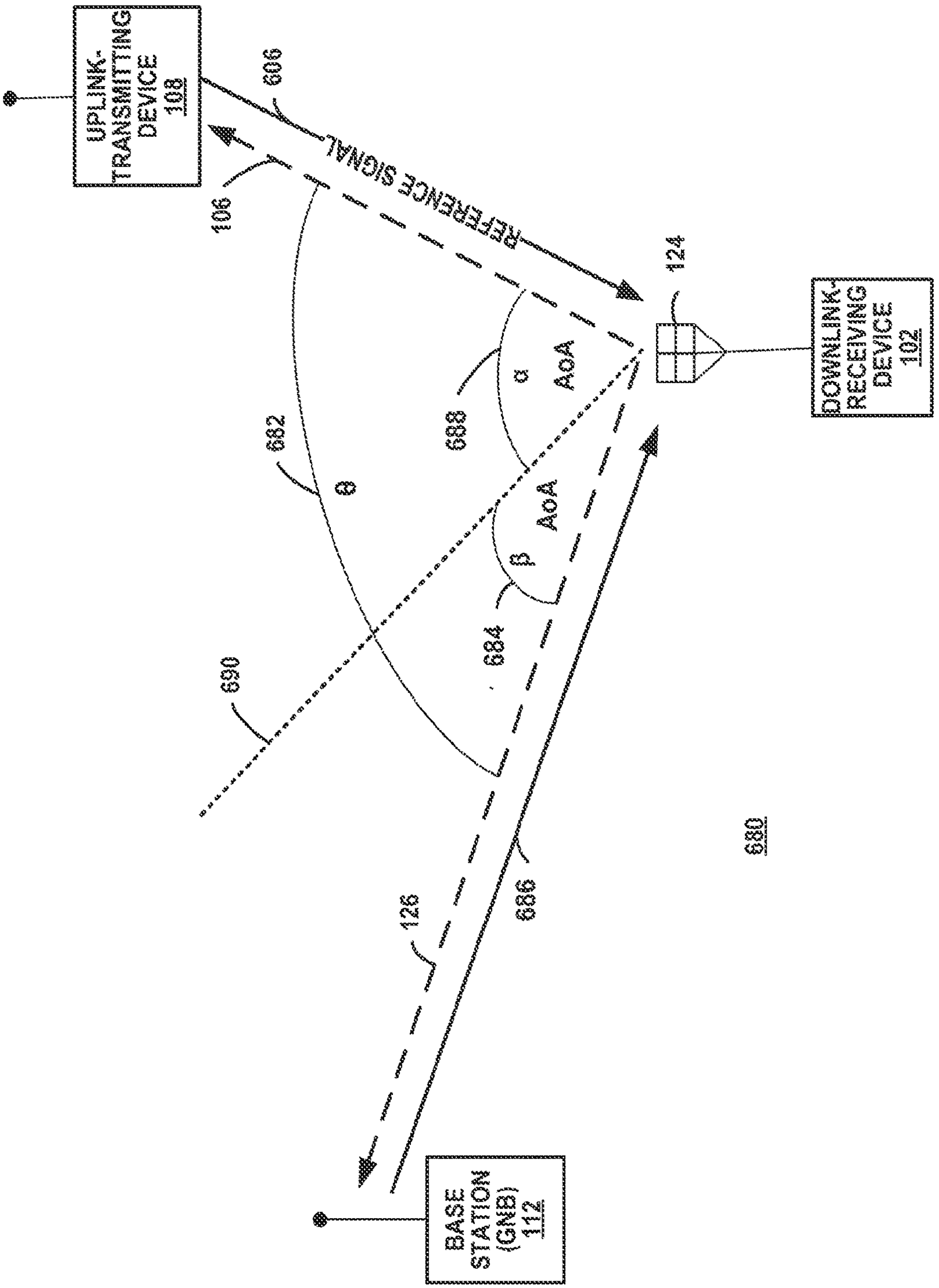
FIG. 6C is an illustration of the relationship between the angle of arrival (AoA) of signals and a device angle, θ, between uplink-transmitting device and base station.

FIG. 6C is an illustration 680 of the relationship between the angle of arrival (AoA) of signals and a device angle, θ, 682 between uplink-transmitting device 108 and base station 112. The downlink-receiving device 102 includes multiple antennas, a multiple element antenna, an antenna array, directional receive antenna, or other suitable antenna structure capable of measuring an AoA of a signal. For the example, a AoA capable antenna 124 of the downlink-receiving device 102 is utilized to determine or estimate the AoA, β, 684 of a wireless signal 686 received from the base station 112 and the AoA, α, 688 of a signal transmitted from the uplink-transmitting device 108 as received at the downlink-receiving device 102. Since the direction 106 is coincident with the reference signal 606 direction, the AoA, α, 688 is between the reference 690 and the reference signal 106. Similarly, the direction 126 is coincident with the direction of the wireless signal 686 and the AoA, β, 684 is between the reference 690 and the wireless signal 686. The signal used to measure AoA, α, 688 is the reference signal 606 for the example. The AoA of a signal may be determined relative to a reference direction 690. Although the reference direction 690 is represented by a dashed line between the directions 126, 106 (and between the signals 606, 686) in FIG. 6C, the reference may be in any direction or orientation. The reference direction 690 may be geographical north and positive in a counterclockwise direction, for example. The downlink-receiving device 102 estimates or determines the AoA, β, 684 of the wireless signal 686 and the AoA, α, 688 of the reference signal 606 and, based on the results, determines the device angle, θ, 682.

Figure 7A:
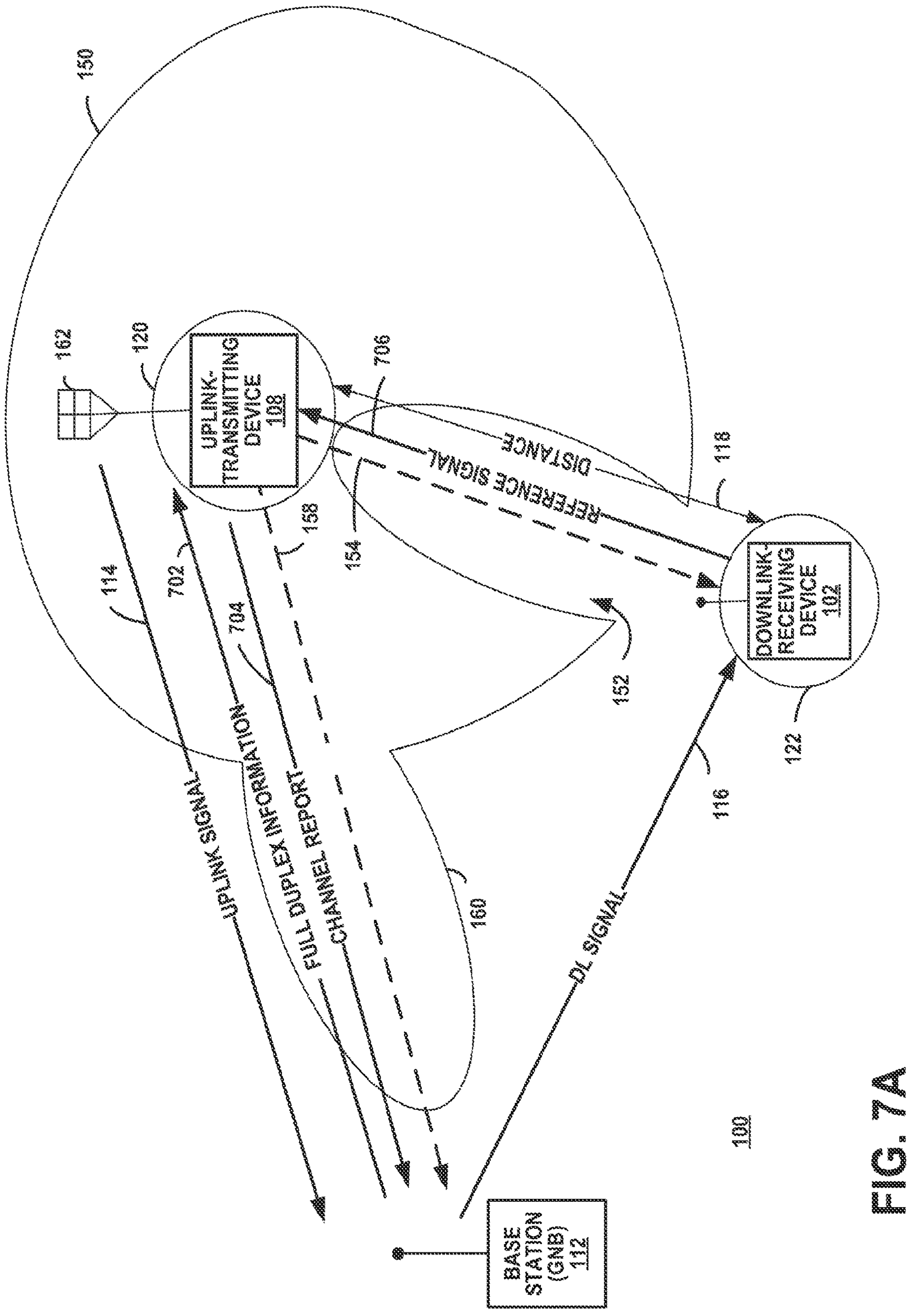
FIG. 7A is a block diagram of an example of the communication system where the base station receives channel state information to generate full duplex information and the uplink-transmitting device adjusts the transmission antenna pattern to have a transmission null in the direction of the downlink-receiving device 102 based on the full duplex information.

FIG. 7A is a block diagram of an example of the communication system 100 where the base station 112 receives channel state information to generate full duplex information 702 and the uplink-transmitting device 108 adjusts the transmission antenna pattern 150 to have a transmission null 152 in the direction 154 of the downlink-receiving device 102 based on the full duplex information 702. The uplink-transmitting device 108 receives the full duplex information 702 from the base station 112 where the full duplex information 702 at least provides antenna parameters for adjusting the transmit antenna pattern 150 and identifies the transmission timing of the downlink transmission from the base station 112 to the downlink-receiving device 102. For the example, the full duplex information 702 identifies the downlink-receiving device 102. As discussed above, the uplink-transmitting device 108 transmits at least one uplink signal 114 at the timing assigned by the station 112 within a channel. The downlink-receiving device 102 is scheduled to receive at least one downlink signal 116 using the same channel used by the uplink-transmitting device 108 to transmit the at least one uplink signal 114. Therefore, the base station 112 schedules uplink transmission from the uplink-transmitting device 108 and downlink transmission to the downlink-receiving device 102 such that at least one uplink signal 114 will be transmitted from the uplink-transmitting device at the same time and within the same channel as transmission of at least one downlink signal 116 to the downlink-receiving device 102.

The base station 112 receives channel state information from at least one of the two UE devices 102, 108. For the example of FIG. 7A, the uplink-transmitting device 108 transmits a channel report 704 that at least includes channel state information about the channel between the downlink-receiving device 102 and the uplink-transmitting device 108. A reference signal 706 transmitted from the downlink-receiving device 102 is measured or otherwise evaluated to generate the channel report 704.

Based at least partially on the channel report 704, the base station 112 generates and transmits full duplex information 702 to the uplink-transmitting device 108. The uplink-transmitting device 108 applies the full duplex information 702 to adjust the antenna pattern 150 and create a transmission null 152 in the direction 154 of the downlink-receiving device 102.

The channel report 704 includes information that allows the base station 112 to determine antenna parameters to be applied at the uplink-transmitting device 108 to reduce interference due to the uplink signal 114 with transmissions from the base station 112 to the downlink-receiving device 102. The channel report 704 at least includes a received power indicator indicating the received power of the reference signal and a device angle between the direction 154 to the downlink-receiving device and the direction 158 to the base station 158 from the uplink-transmitting device. Accordingly, the device angle indicates the direction 154 to the downlink-receiving device 102. As discussed below with reference to FIG. 7C, the device angle may be based on angle of arrival (AoA) measurements taken by the uplink-transmitting device 108. The channel report may include other information such as the geographical location. For the example, the channel report is a Sidelink Channel State Information (SL CSI) report in accordance with at least one revision of the 3GPP communication specification.

The reference signal 706 may be any signal transmitted from the downlink-receiving device 102 that provides an indication of the channel between the two UE devices 102, 108. In some examples, the reference signal 706 is a Sidelink Channel State Information Reference Signal (SL-CSI-RS) that is typically used in conventional systems for measuring channel state information between device-to-device (D2D) capable UE devices. In other examples, the reference signal is a D2D discovery signal. In the example, the uplink-transmitting device 108 receives the reference signal and generates the channel report 704 based on measurements of the signal. In some situations, the channel report may be transmitted by a UE device other than the device receiving the reference signal. In one scenario, for example, the uplink-transmitting device 108 transmits a reference signal that is measured by the downlink-receiving device 102. The downlink-receiving device 102 sends a feedback message to the uplink-transmitting device 108 which provides the data for the channel report that is then transmitted by the uplink-transmitting device 108 to the base station 112.

The transmission of the channel report may be in response to a request from the base station, a periodic transmission, or in response to a trigger event. Where the transmission is periodic or in response to a trigger event, the criteria for transmission may be preconfigured and/or may be dynamically configured by the base station.

For the examples discussed with reference to FIG. 7A and FIG. 7B, the channel reporting is performed using a modified SL CSI reporting procedure. Examples of suitable techniques and alternatives includes the examples discussed above with reference to FIG. 6A.

Figure 7B:
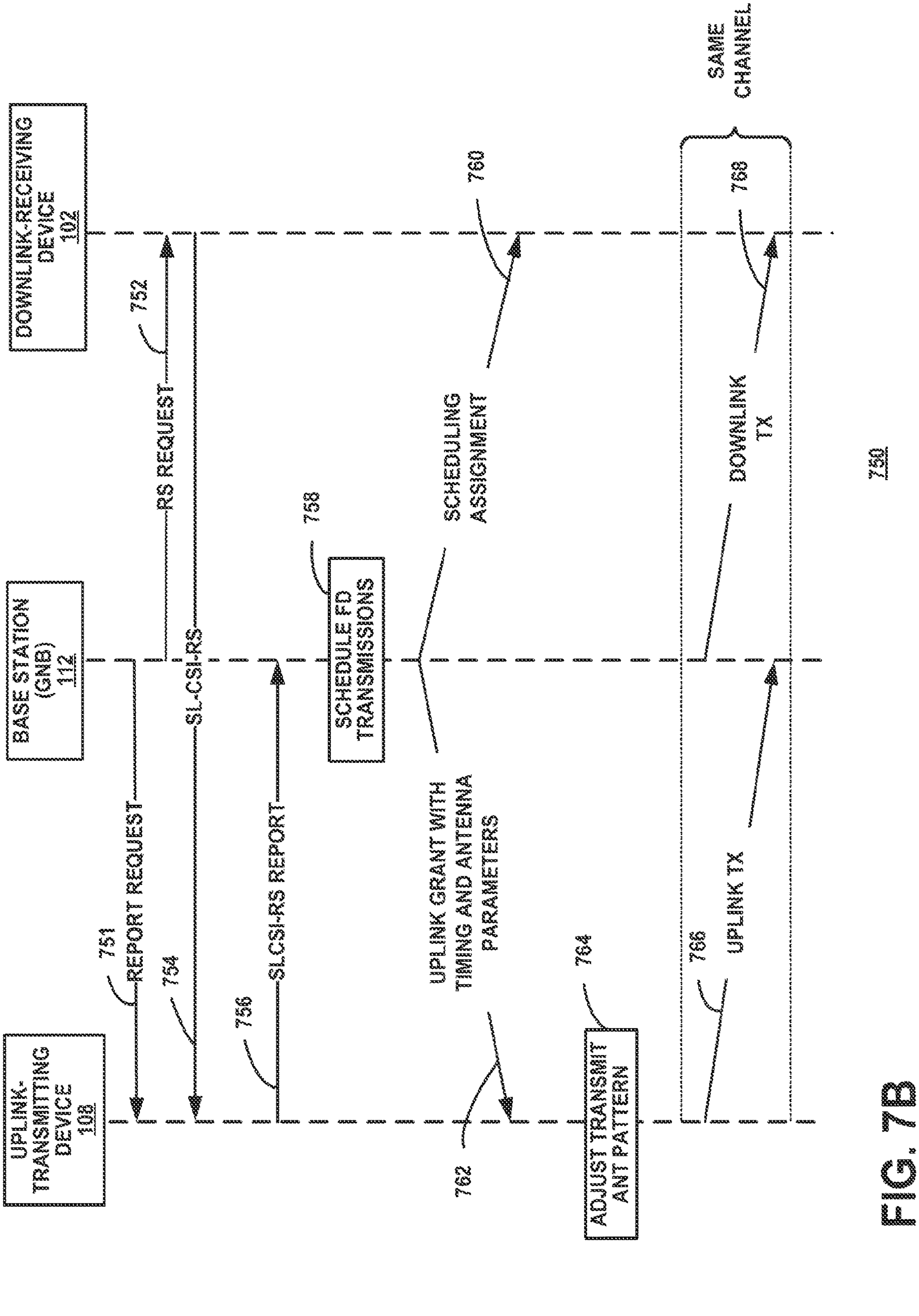
FIG. 7B is a messaging diagram for an example where side link channel report is provided to the base station and full duplex information is provided to the uplink-transmitting device.

FIG. 7B is a messaging diagram 750 for an example where a sidelink channel report is provided to the base station 112 and full duplex information 702 is provided to the uplink-transmitting device 108. FIG. 7B depicts the control and data messages that are transmitted between the downlink-receiving device 102, the uplink-transmitting device 108, and the serving base station 112. In the interest of clarity and brevity, not all of the messages that are transmitted between the devices are included in FIG. 7B. Moreover, one or more of the messages that are shown in FIG. 7B may be omitted. Likewise, additional messages may be included beyond those shown in FIG. 7B that facilitate interference reduction during full duplex communication.

At transmission 751, the base station 112 sends a report request to initiate a channel state information procedure to obtain information regarding the sidelink channel between downlink-receiving device 102 and the uplink-transmitting device 108. For the example, the report request in the transmission 751 instructs the uplink transmitting device 108 to provide a SL-CSI report to the base station. The base station 112 also sends a RS request, at transmission 752, instructing the downlink-receiving device 102 to transmit a reference signal to the uplink-transmitting device 108. For the example, the RS request instructs the downlink-receiving device 102 to transmit a SL-CSI-RS over the sidelink channel. As discussed above, RRC, MAC CE and DCI messages may be used in some situations to send the RS request.

At transmission 754, the downlink-receiving device 102 sends a SL-CSI RS which is received by the uplink-transmitting device 108 over the sidelink channel. The SL-CSI RS is an example of a reference signal 706 discussed above.

At transmission 756, the uplink-transmitting device 108 sends a SL CSI report to the base station 112. The SL CSI report is an example of the channel report 704. After measuring the channel based on the SL CSI RS, the uplink-transmitting device 108 generates and sends the CSI report.

Since reciprocity applies to the sidelink channel, transmissions 752, 754, 756 may be directed to and from different UE devices in some situations. For example, transmission 752 may be received by the uplink-transmitting device 108 which then transmits the SL CSI RS to the downlink-receiving device 102 at transmission 754. The CSI report can then be sent by the downlink-receiving device 102 at transmission 756.

At event 758, the base station (gNB) 112 schedules the full duplex transmissions for the two UE devices 102, 108. The base station 112 schedules the transmission of downlink signal 116 to the downlink-receiving device 102 and the transmission of the uplink signal 114 from the uplink-transmitting device 108 where the transmissions are scheduled for the same channel and at the same time.

At transmission 760, the base station 112 sends a downlink scheduling assignment to the downlink-receiving device 102. The downlink scheduling assignment identifies the downlink communication resources that will be used to transmit the downlink signal 116.

At transmission 762, the base station sends an uplink grant to the uplink-transmitting device 108. The uplink grant identifies the uplink communication resources that should be used to transmit the uplink signal 114 to the base station 112. For the example, the uplink grant also includes full duplex information 702 where the information includes at least the timing of the scheduled downlink signal 116 transmission and transmit precoder parameters. Accordingly, the transmission 762 is an example of the transmission of the full duplex information 702 of FIG. 7A.

At event 764, the uplink-transmitting device 108 adjusts the transmit antenna pattern 150 to minimize, or at least reduce, interference to the downlink signal 116 at the downlink-receiving device 102 from the uplink signal 114. For the example, the uplink-transmitting device 108 applies the transmission precoder parameters received from the base station 112 to establish a transmit antenna pattern 150 that at least includes a transmission null 152 in the direction 154 of the downlink-receiving device 102. The uplink-transmitting device 108 establishes the interference-reducing transmission antenna pattern for at least the time when the uplink signal 114 and the downlink signal 116 are transmitted.

At transmission 766, the uplink signal 114 is transmitted and, at transmission 768, the downlink signal 116 is transmitted. The uplink signal 114 and downlink signal 116 are transmitted in the same time slot(s) and within the same channel. The interference-reducing receive antenna pattern 104 mitigates the interference of the uplink signal 114 with the downlink signal 116 at the downlink-receiving device 102.

Figure 7C:
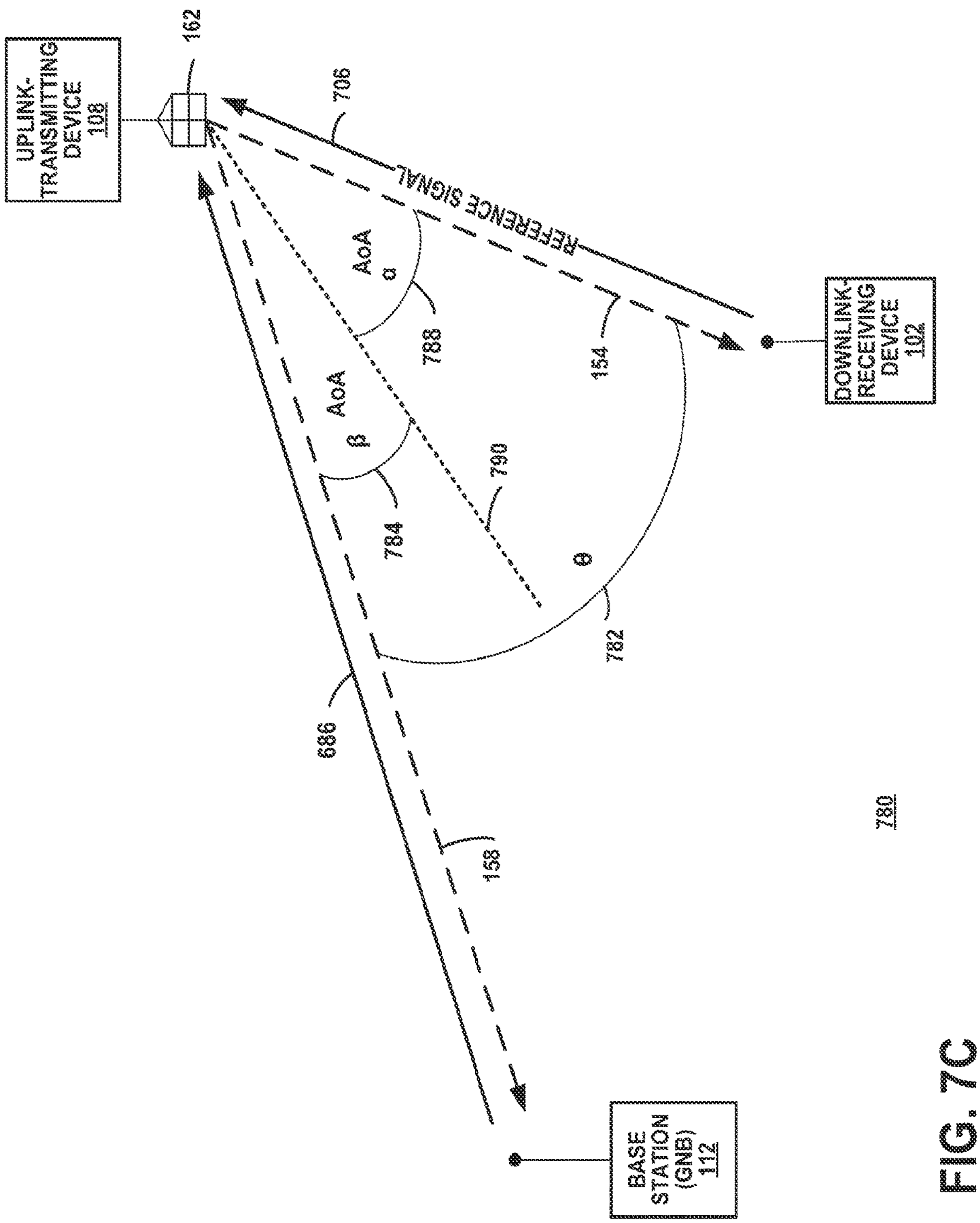
FIG. 7C is an illustration of the relationship between the angle of arrival (AoA) of signals and a device angle, θ, between downlink-receiving device and base station.

FIG. 7C is an illustration 780 of the relationship between the angle of arrival (AoA) of signals and a device angle, θ, 782 between downlink-receiving device 102 and base station 112. The uplink-transmitting device 108 includes multiple antennas, a multiple element antenna, an antenna array, directional receive antenna, or other suitable antenna structure capable of measuring an AoA of a signal. For the example, a AoA capable antenna 162 of the uplink-transmitting device 108 is utilized to determine or estimate the AoA, β, 784 of a wireless signal 786 received from the base station 112 and the AoA, α, 788 of a signal transmitted from the downlink-receiving device 102 as received at the uplink-transmitting device 108. The signal used to measure AoA, α, 688 is the reference signal 706 for the example. The AoA of a signal may be determined relative to a reference direction 790. Although the reference direction 790 is represented by a dashed line between the directions 154, 158 (and between the signals 706, 786) in FIG. 7C, the reference may be in any direction or orientation. The reference direction 790 may be geographical north and positive in a counterclockwise direction, for example. The uplink-transmitting device 108 estimates or determines the AoA, β, 784 of the wireless signal 786 and the AoA, α, 788 of the reference signal 706 and, based on the results, determines the device angle, θ, 782.

Figure 8:
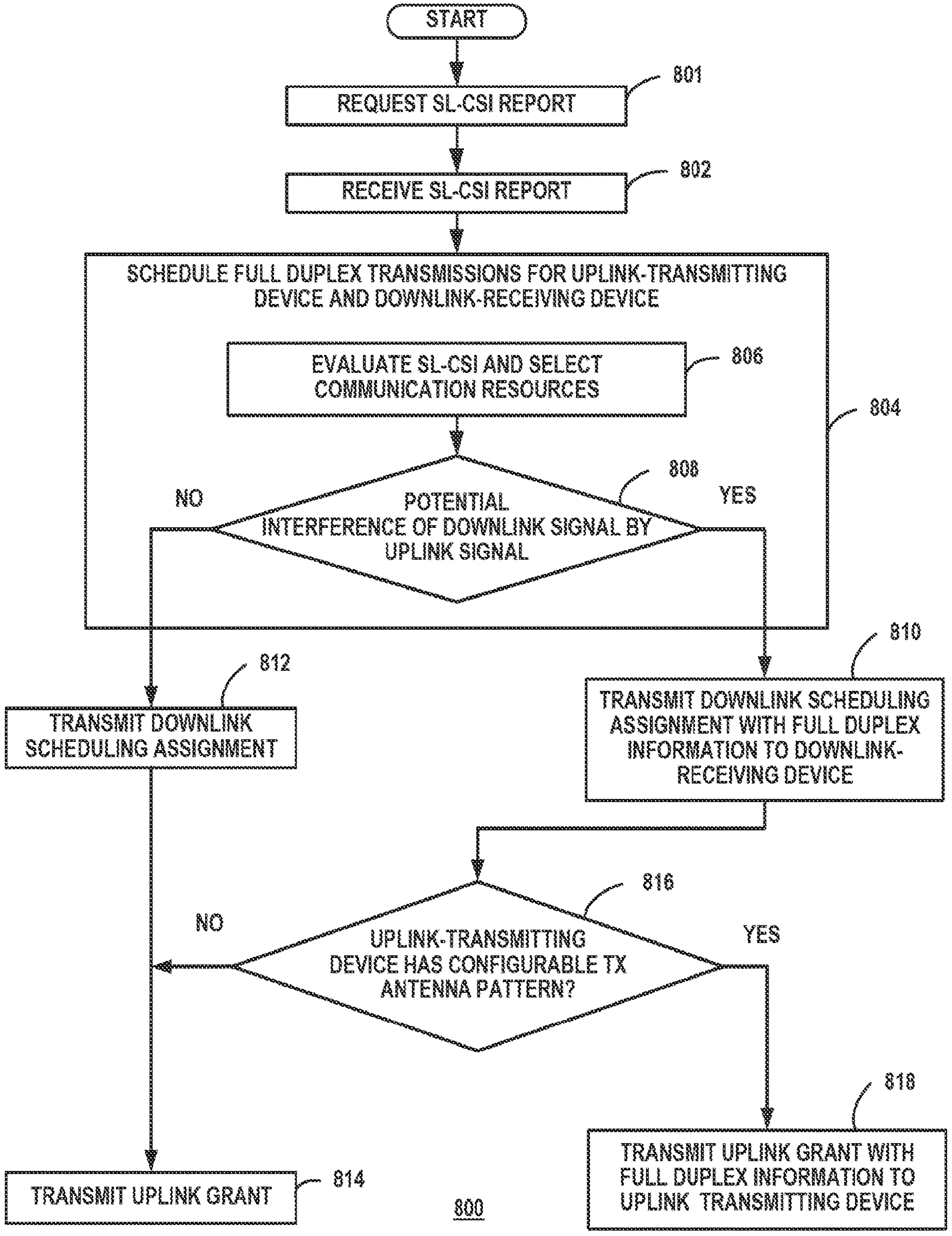
FIG. 8 is a flow chart of an example of method of managing full duplex communication to reduce interference at a downlink receiving UE device.

FIG. 8 is a flow chart of an example of method of managing full duplex communication to reduce interference at a downlink-receiving device 102. The method may be performed at a base station, eNodeB, gNodeB or other device providing communication service to UE devices within a geographical area. Accordingly, the method may be performed by the base station 112. The steps of the method may be performed in a different order and some steps may be performed simultaneously in some situations. One or more steps may be omitted in some situations and the method may include additional steps.

At step 802, the SL-CSI is received from at least one UE device. For the example, the base station receives a SL SCI report from a downlink-receiving device 102. The base station 112 stores the channel state information and updates the information as updates are provide by either UE device 102, 108.

At step 804, the full duplex transmissions are scheduled. The base station selects the communication resources for uplink transmission from the uplink-transmitting device 108 and for downlink transmissions to the downlink-receiving device 102. For the example, the base station 112 evaluates the SL-CSI information when selecting the resources at step 806 and determines the potential for interference of the downlink signal by uplink signal at the downlink-receiving device at step 808.

The base station evaluates the status of the channel between the two UE devices 102, 108, and determines whether a potential for interference exists with the scheduled resources. The base station may evaluate numerous factors in scheduling the transmission and may avoid scheduling resources that are more likely to result in interference. In some circumstances, however, the resources are selected that may result in interference in order to meet other scheduling criteria. In the interest of increasing communication traffic and capacity, for example, full duplex communication scheduling may be selected that is likely to result in interference without antenna pattern interference mitigation. Scheduling may also take into account the capabilities of the UE devices. If it is determined that there is a potential for interference, the method proceeds at step 810. Otherwise, the method continues at step 812.

At step 812, a downlink scheduling assignment is transmitted to the downlink-receiving device 102. The downlink scheduling assignment identifies the communication resources that will be used to transmit the downlink signal to the downlink-receiving device 102.

At step 814, an uplink grant is transmitted to the uplink-transmitting device 108. The uplink grant identifies the communication resources that should be used by the uplink-transmitting device to transmit the uplink signal to the base station 112.

At step 810, a scheduling assignment with full duplex information is transmitted to the downlink-receiving device 102. The scheduling assignment identifies the communication resources that will be used to transmit the downlink signal to the downlink-receiving device 102. The scheduling assignment also at least provides the timing of the uplink signal 114 and provide receive antenna parameters, such as receiver weight combiner parameters.

At step 816, it is determined whether the uplink-transmitting device 108 has the capability to configure the transmission antenna pattern. The capabilities of the uplink-transmitting device may be provided to the base station in uplink control messages in some situations. If the uplink-transmitting device 108 has the capability to configure the transmission antenna pattern, the method proceeds to step 818. Otherwise, the method continues at step 814. In some situations, step 816 can be omitted and the method proceeds from step 810 to step 818. In other situations, step 816 can be omitted and the method proceeds from step 810 to step 814. In still other situations, steps 816 and 818 are both omitted.

At step 818, an uplink grant with full duplex information is transmitted to the uplink-transmitting device 108. The uplink grant identifies the communication resources that should be used to transmit the uplink signal 114 to the base station 112. The uplink grant with full duplex information also at least provides the timing of the downlink signal 116 and the transmission antenna parameters, such as transmitter precoder parameters.

Figure 9:
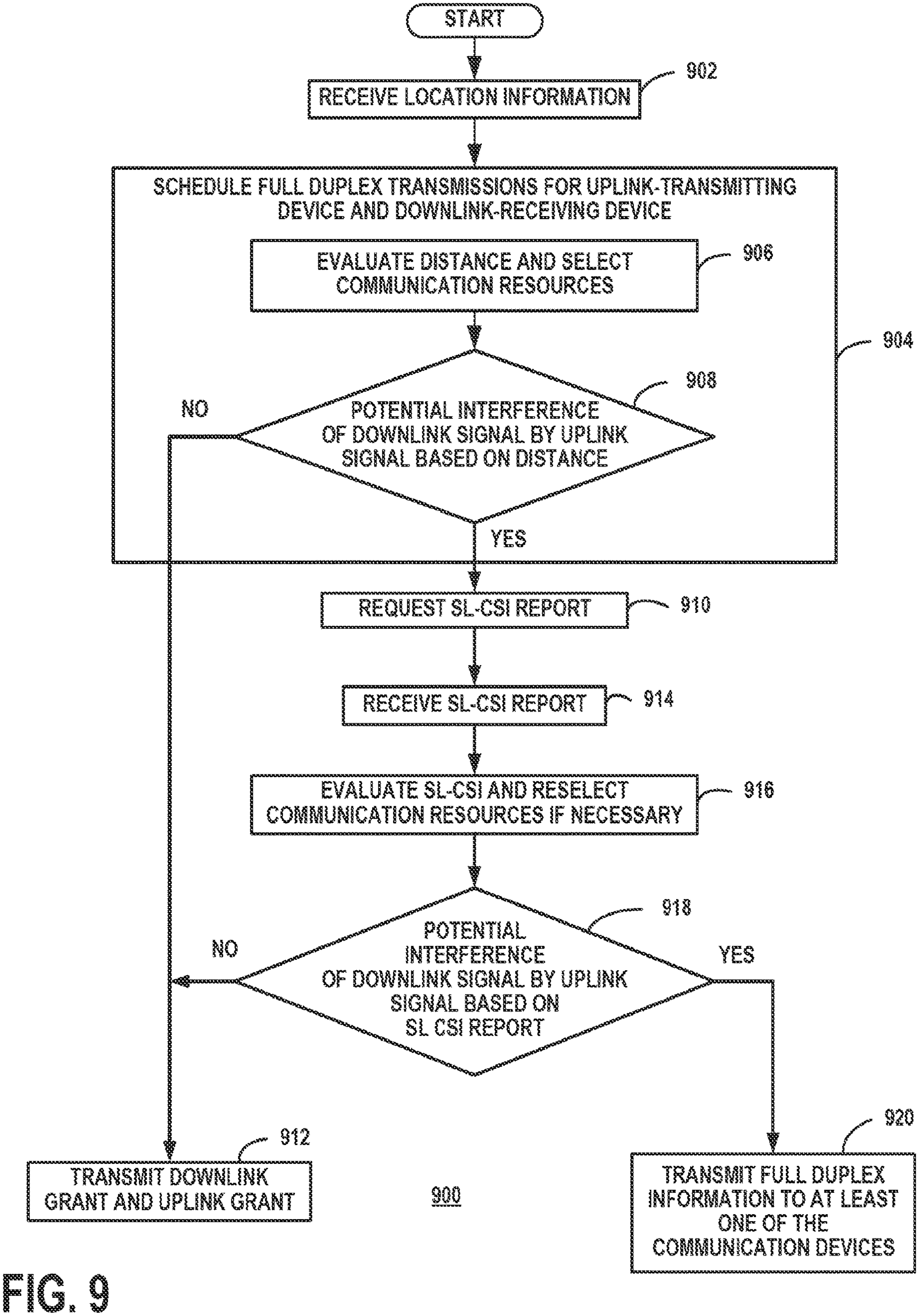
FIG. 9 is a flow chart of an example of method of managing full duplex communication to reduce interference at a downlink-receiving device based on distance and sidelink channel state.

FIG. 9 is a flow chart of an example of method of managing full duplex communication to reduce interference at a downlink-receiving device 102 based on distance and sidelink channel state. The method may be performed at a base station, eNodeB, gNodeB, or other device providing communication service to UE devices within a geographical area. Accordingly, the method may be performed by the base station 112. The steps of the method may be performed in a different order and some steps may be performed simultaneously in some situations. One or more steps may be omitted in some situations and the method may include additional steps.

At step 902, the location information is received from at least one UE device. For the example, the base station receives NLs from a downlink-receiving device 102 and an uplink-transmitting device 108. The base station 112 stores the location information and updates the information as updates are provide by one or more UE devices.

At step 904, the full duplex transmissions are scheduled. For the example of FIG. 9, the base station manages full duplex communication and scheduled resources based on a distance between UE devices and the state of the SL channel between the UE devices. The base station selects the communication resources for uplink transmission from the uplink-transmitting device 108 and for downlink transmissions to the downlink-receiving device 102. For the example, the base station 112 evaluates the location information when selecting the resources at step 906 and determines the potential for interference of the downlink signal by uplink signal at the downlink-receiving device at step 908. After determining the distance between the two UE devices, the base station compares the distance to a threshold distance. Where the distance is less than the threshold distance, the base station determines that a potential for interference exists with the scheduled resources. The base station may evaluate numerous factors in scheduling the transmission and may avoid scheduling resources that are more likely to result in interference. In some circumstances, however, the resources are selected that may result in interference in order to meet other scheduling criteria. In the interest of increasing communication traffic and capacity, for example, full duplex communication scheduling may be selected that is likely to result in interference without antenna pattern interference mitigation. Scheduling may also take into account the capabilities of the UE devices. If it is determined that there is a potential for interference, the method proceeds at step 910. Otherwise, the method continues at step 912.

At step 912, a scheduling assignment is transmitted to the downlink-receiving device 102 and an uplink grant is transmitted to the uplink-transmitting device 108. The scheduling assignment identifies the communication resources that will be used to transmit the downlink signal to the downlink-receiving device 102. The uplink grant identifies the communication resources that should be used by the uplink-transmitting device to transmit the uplink signal to the base station 112.

At step 910, the base station requests a SL SCI report by initiating a SL CSI reporting procedure. For the example, the base station sends a request to at least one of the UE devices 102, 108 which instructs the UE device to transmit a SL CSI RS. The SL CSI RS is received by the other UE device which then sends a SL CSI report to the base station. The SL CSI report is received at the base station at step 914.

At step 916, the CSI report is evaluated. In some circumstances, the full duplex resources selected at step 906 are modified. For example, if the SL channel between the two UE devices is above a maximum threshold where interference cannot sufficiently be mitigated with antenna pattern manipulation, the base station may select other resources. In situations, the base station may determine that full duplex communication is not possible for the two UE devices.

At step 918, the base station determines the potential for interference of the downlink signal by uplink signal at the downlink receiving UE device. The base station evaluates the status of the channel between the two UE devices 102, 108, and determines whether a potential for interference exists with the scheduled resources. If it is determined that there is a potential for interference, the method proceeds at step 920. Otherwise, the method continues at step 912.

At step 920, full duplex information is transmitted to at least one of the UE devices 102, 108 with the resource grant. Where full duplex information is transmitted to the downlink receiving UE device, a scheduling assignment with full duplex information is transmitted to the downlink-receiving device 102. The scheduling assignment identifies the communication resources that will be used to transmit the downlink signal to the downlink-receiving device 102. The scheduling assignment also at least provides the timing of the uplink signal 114 and provides receive antenna parameters, such as receiver weight combiner parameters. If full duplex information is transmitted to the uplink-transmitting device 108, an uplink grant with full duplex information is transmitted to the uplink-transmitting device 108. The uplink grant identifies the communication resources that should be used to transmit the uplink signal 114 to the base station 112. The uplink grant with full duplex information also at least provides the timing of the downlink signal 116 and the transmission antenna parameters, such as transmitter precoder parameters.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A communication device comprising:

a receive antenna;

a receiver coupled to the receive antenna and configured to receive full duplex information from a base station, the full duplex information comprising receiver weight combiner parameters based on a sidelink channel state report of a sidelink channel between the communication device and an uplink-transmitting device, the sidelink channel state report received at the base station; and a receive antenna controller configured to adjust, based on the receiver weight combiner parameters, at least one of the receive antenna and the receiver to create a receive antenna pattern having a reception null in an uplink device direction from the communication device to the uplink-transmitting device when the receiver is receiving a downlink signal from the base station in a channel and the uplink-transmitting device is transmitting an uplink signal in the channel, a null reception gain within the reception null being less that at least one other portion of the receive antenna pattern.

2. The communication device of claim 1, wherein the null reception gain is less than a base station portion of the antenna pattern in a base station direction from the communication device to the base station.

3. The communication device of claim 2, further comprising a transmitter configured to transmit the sidelink channel state report to the base station.

4. The communication device of claim 3, wherein the sidelink channel state report comprises a received signal strength of a reference signal transmitted by the uplink-transmitting device.

5. The communication device of claim 3, wherein the sidelink channel state report is a Sidelink Channel State Information (SL CSI) report in accordance with at least one revision of a 3GPP communication specification.

6. The communication device of claim 5, wherein the reference signal is a SL CSI reference signal report in accordance with at least one revision of the 3GPP communication specification.

7. The communication device of claim 5, wherein the reference signal is a device-to device (D2D) discovery signal.

8. The communication device of claim 1, wherein the receiver is configured to receive, from the base station, a sidelink report request requesting the sidelink channel state report.

9. The communication device of claim 1, wherein the sidelink report request identifies the uplink transmitting UE device.

10. The communication device of claim 1, wherein the receive antenna controller is configured to adjust at least one of the receive antenna and the receiver to create the receive antenna pattern to have a reception lobe in a base station direction from the communication device to the base station when the receiver is receiving the downlink signal from the base station and the uplink-transmitting device is transmitting the uplink signal, a lobe reception gain within the reception lobe being greater that all other portions of the receive antenna pattern.

11. The communication device of claim 1, wherein the uplink-transmitting device is an uplink-transmitting user equipment (UE) device.

12. The communication device of claim 1, wherein the base station is an Integrated Access and Backhaul (IAB) donor and the communication device is an IAB node.

13. The communication device of claim 12, wherein the uplink-transmitting device is an uplink-transmitting IAB node.

14. A communication device comprising:

a receiver configured to receive full duplex information from a base station, the full duplex information comprising transmitter precoder parameters based on a sidelink channel state report of a sidelink channel between the communication device and a downlink-receiving user equipment device;

a transmitter;

a transmit antenna coupled to the transmitter; and a transmit antenna controller configured to adjust, based on the transmitter precoder parameters, at least one of the transmit antenna and the transmitter to create a transmit antenna pattern having a transmission null in a downlink device direction from the communication device to the downlink-receiving device when the transmitter is transmitting an uplink signal to the base station and the downlink-receiving device is receiving the downlink signal, a null transmission gain within the transmission null being less that at least one other portion of the transmission antenna pattern.

15. The communication device of claim 14, wherein the null transmission gain is less than a base station portion of the antenna pattern in a base station direction from the communication device to the base station.

16. The communication device of claim 15, the transmitter further configured to transmit, to the base station, a sidelink channel state report of a sidelink channel between the communication device and the uplink-transmitting device.

17. The communication device of claim 1, wherein the downlink-receiving device is an downlink-receiving user equipment (UE) device.

18. The communication device of claim 1, wherein the base station is an Integrated Access and Backhaul (IAB) donor and the communication device is an IAB node.

19. A base station comprising:

a receiver configured to receive a sidelink channel state report of a sidelink channel between a downlink-receiving device and an uplink-transmitting device;

a controller configured to schedule full duplex communication comprising transmission of a downlink signal from the base station to the downlink receiving user equipment (UE) device within a channel and transmission of an uplink signal from the uplink-transmitting device to the base station within the channel and at the same time as the transmission of the downlink signal, the controller configured to determine full duplex information based on the sidelink channel state report; and a transmitter configured to transmit full duplex information to at least one of the uplink-transmitting device and the downlink-receiving device to invoke an interference-reducing antenna pattern at the least one of the uplink-transmitting device and the downlink receiving UE device, the interference-reducing antenna pattern comprising a null in a direction, the direction from the uplink-transmitting device to the downlink-receiving device when the interference-reducing antenna pattern is a transmission antenna pattern at the uplink transmission UE device, the direction from the downlink-receiving device to the uplink-transmitting device when the interference-reducing antenna pattern is a receive antenna pattern at the downlink receiving UE device, when the full duplex information is transmitted to the downlink receiving UE device, the full duplex information comprising timing of the uplink signal and receiver weight combiner parameters, the receiver weight combiner parameters resulting in the reception antenna pattern when applied at the downlink receiving UE device, when the full duplex information is transmitted to the uplink-transmitting device, the full duplex information comprising timing of the downlink signal and transmitter precoder parameters, the transmitter precoder parameters resulting in the transmission antenna pattern when applied at the uplink-transmitting device.

20. The base station of claim 19, wherein the null is a reception null in the receive antenna pattern, the reception null having a null reception gain less than a base station reception gain of the receive antenna pattern in a first base station direction from the downlink-receiving device to the base station and wherein the null is a transmission null in the transmission antenna pattern, the transmission null having a null transmission gain less than a base station transmission gain of the transmission antenna pattern in a second base station direction from the uplink-transmitting device to the base station.

* * * * *